(12) United States Patent
Chang

(10) Patent No.: US 10,923,996 B2
(45) Date of Patent: Feb. 16, 2021

(54) DC MOTOR-DYNAMO

(71) Applicant: Chun-Jong Chang, Zhubei (TW)

(72) Inventor: Chun-Jong Chang, Zhubei (TW)

(*) Notice: Subject to any disclaimer, the term of this patent is extended or adjusted under 35 U.S.C. 154(b) by 37 days.

(21) Appl. No.: 16/594,087

(22) Filed: Oct. 7, 2019

(65) Prior Publication Data

US 2020/0127546 A1 Apr. 23, 2020

(30) Foreign Application Priority Data

Oct. 17, 2018 (TW) .................. 107136624
Oct. 17, 2018 (TW) .................. 107214054

(51) Int. Cl.
*H02K 21/20* (2006.01)
*H02K 21/36* (2006.01)

(52) U.S. Cl.
CPC ............ *H02K 21/36* (2013.01); *H02K 21/20* (2013.01)

(58) Field of Classification Search
CPC ...... H02K 1/187; H02K 1/2786; H02K 19/18; H02K 21/20; H02K 21/28–21/36; H02K 23/54; H02K 37/18; H02K 55/06
See application file for complete search history.

(56) References Cited

U.S. PATENT DOCUMENTS

2017/0249968 A1* 8/2017 Yoneda .................. H02K 7/085

* cited by examiner

*Primary Examiner* — Ramon M Barrera

(57) ABSTRACT

This present invention provides a novel DC dynamo which is characterized by making the magnetic lines of flux pass through an air gap between the rotator and the stator in the same direction, thus the most of armature coils can always receive the electromotive force of the same polarity in the same direction. Therefore, bidirectional energy conversion between the mechanical energy and the electrical energy of the armature coils in series can still proceed in the absence of commutators and induced the armature to generate sufficient electromotive force to conveniently regulate suitable terminal voltages and the ratios of the rotating speed and the moving speed thereof.

20 Claims, 20 Drawing Sheets

10/10'/10"

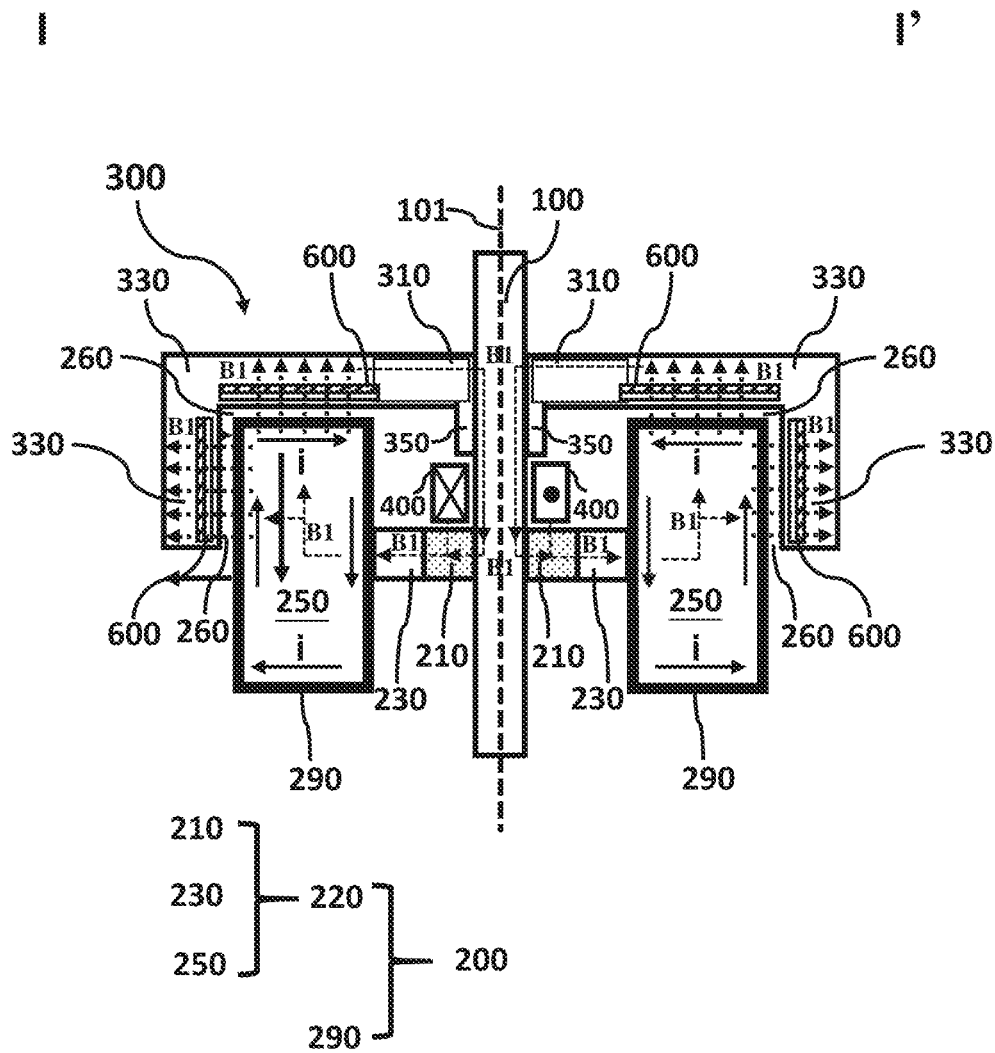
FIG. 1C"

20/20'/20''

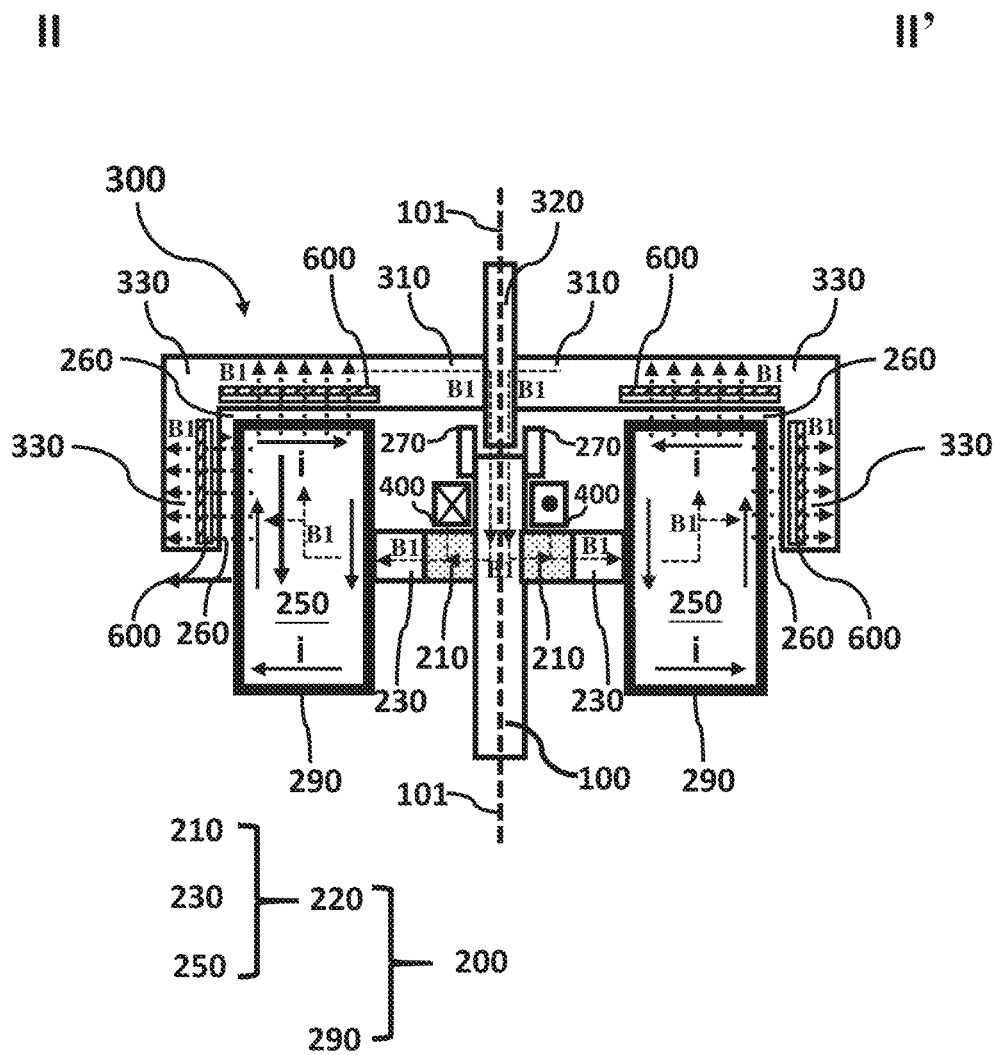
FIG. 2C"

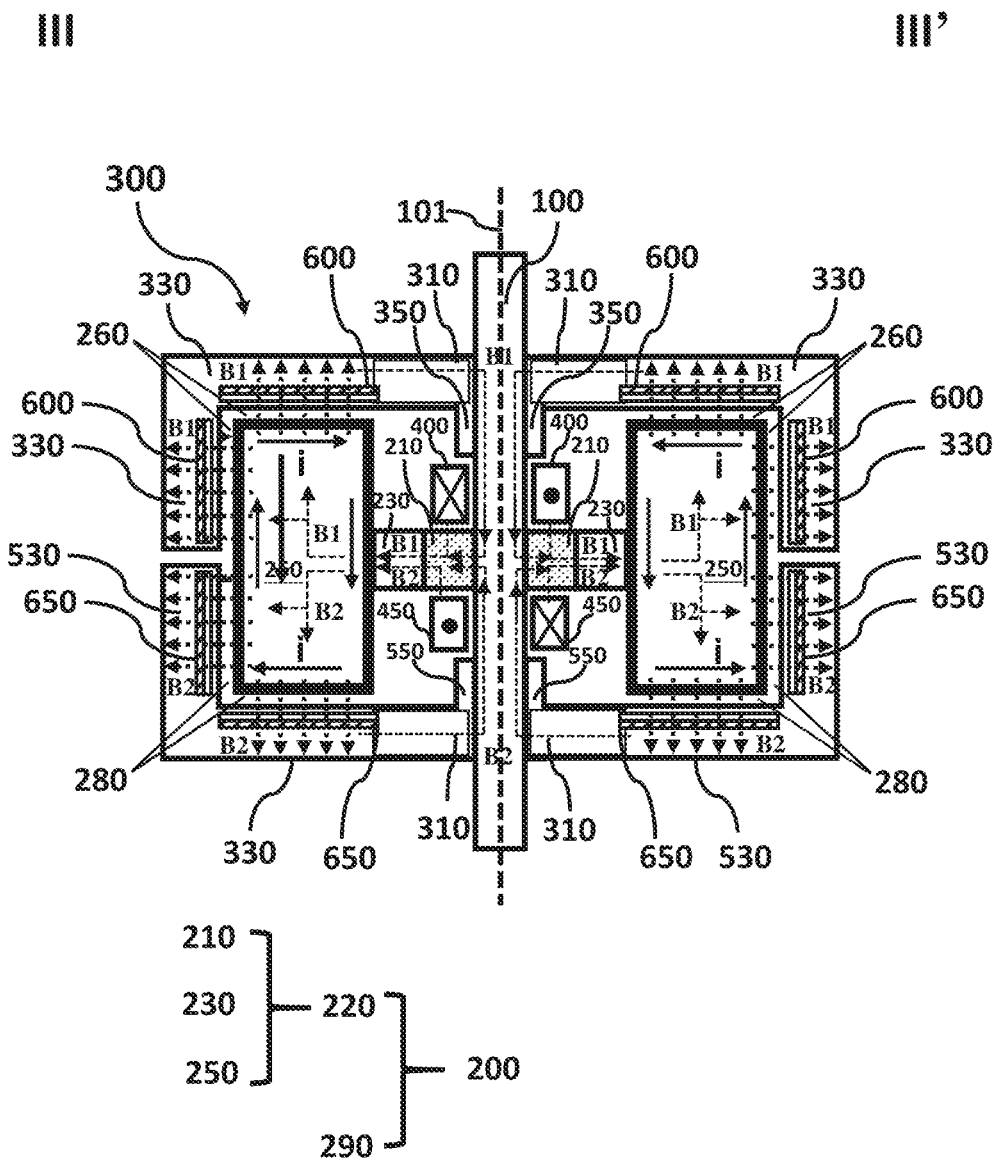
FIG. 3C"

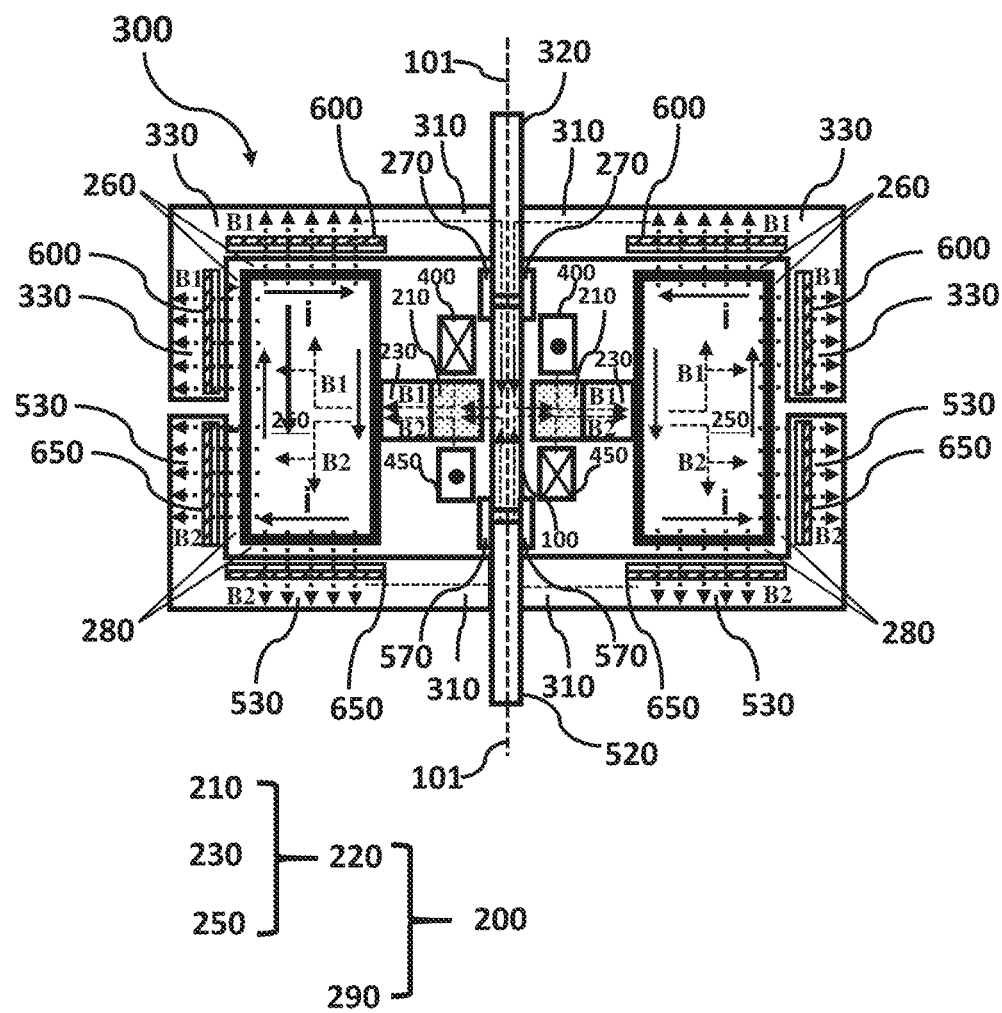
FIG. 4C″

DC MOTOR-DYNAMO

This application claims the benefit of TW invention patent application No. 107136624, filed on Oct. 17, 2018, and TW utility model patent application No. 107214054, filed on Oct. 17, 2018, and the entirety of which are incorporated by reference herein.

BACKGROUND OF THE INVENTION

Field of the Invention

The present invention relates to a DC dynamo and particularly relates to a commutatorless DC dynamo.

Description of the Related Art

The conventional DC dynamo usually includes commutators (i.e. rectifier) to always keep the magnetic field of the rotor perpendicular to the magnetic field of the stator during rotation to generate a greatest torque. Meanwhile, the DC dynamos continuously head the lists of rotation speed controlling and servo controlling fields owing to advantages of voltage proportion to the rotation speed and hence naturally easy to control. The brushless DC dynamo (BLDC dynamo) is now very popular in the market, which has a structure like a permanent-magnet variable frequency synchronous AC dynamo, wherein the rotatable angle of the stator is determined by a so-called multiple phase magnetic field, for example three phases magnetic field, thus the permanent rotor can be rotated by a magnetic field with variable rotation velocities to serve as a motor; or, the electromotive force induced by a permanent rotor can be transformed into AC power by a multiphase coil, such as a three phase coil, to serve as a generator. However, the VVVF control method of state-of-the-art BLDC is too complex and unnatural, so a novel brushless DC dynamo with a working mode more close to that of the convention DC dynamo is highly expected.

In order to resolve the problems that the conventional DC dynamos are suffering, this present invention provides a novel DC dynamo which is characterized by making the magnetic lines of flux pass through an air gap between the rotator and the stator in the same direction, thus the most of armature coils can always receive the electromotive force of the same polarity in the same direction. Therefore, bidirectional energy conversion between the mechanical energy and the electrical energy of the armature coils in series can still proceed in the absence of commutators and induced the armature to generate sufficient electromotive force to conveniently regulate suitable terminal voltages and the ratios of the rotating speed and the moving speed thereof.

SUMMARY OF THE INVENTION

A feature of this invention provides A DC dynamo, comprising: a central axis; an armature apparatus with a first side and a second side opposite to each other, comprising a body and a plurality of armature coils, and wherein the body includes a central body coupled to the central axis, a peripheral body surrounding the central body and a plurality of middle bodies for connecting the central body and the peripheral body, and the peripheral body is wound by the armature coils, and the number of the armature coils is no less than 2; a first magnetic mechanism adjacent to the first side of the armature apparatus, comprising a first central area, a first peripheral area surrounding the first central area, wherein part or whole of the first peripheral area corresponds to the armature coils, and there is a first air gap between the first magnetic mechanism and the armature coils; a first magnetic field generator for generating a closed-loop first magnetic field between the first magnetic mechanism and the first armature apparatus, wherein the first magnetic lines of flux are flowing between the first magnetic mechanism and the first armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along a virtual axis along the same direction as that of the central axis; and a pair of armature electrodes with a substantially same polarity of electromotive force electrically interconnecting the armature coils and an outer system.

Another feature of the DC dynamo as mentioned above, wherein the first magnetic field generator is an electromagnet coil and/or a first permanent magnet.

Another feature of the DC dynamo as mentioned above, wherein the first magnetic field generator is a first electromagnet coil located between the first magnetic mechanism and the armature apparatus to generate a closed-loop first magnetic field, wherein almost all of the first magnetic lines of flux substantially and orthogonally pass through the first air gap from the armature coils to the first magnetic mechanism or substantially and orthogonally pass through the first air gap from the first magnetic mechanism to the armature coils.

Another feature of the DC dynamo as mentioned above, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

Another feature of the DC dynamo as mentioned above, wherein the armature apparatus is a rotor, and the first magnetic mechanism is a stator.

Another feature of the DC dynamo as mentioned above, wherein the armature apparatus is a stator, and the first magnetic mechanism is a rotor.

Another feature of the DC dynamo as mentioned above is a DC motor, wherein almost all of the first magnetic lines of flux substantially and orthogonally pass through the first air gap from the armature coils to the first magnetic mechanism, and when observing from the longitudinal section of the virtual axis and the current in one of the armature coils flows counterclockwise adjacent to the first air gap, a magnetic force injected inward to the longitudinal section of the virtual axis will be generated by the first magnetic field and the peripheral body of the armature coils based on the Fleming's left hand rule, or when observing from the longitudinal section of the virtual axis and the current in one of the armature coils flows clockwise adjacent to the first air gap, a magnetic force injected outward to the longitudinal section of the virtual axis will be generated by the first magnetic field and the peripheral body of the armature coils based on the Fleming's left hand rule; wherein almost all of the first magnetic lines of flux substantially and orthogonally pass through the first air gap from the first magnetic mechanism to the armature coils, and when observing from the longitudinal section of the virtual axis and the current in one of the armature coils flows counterclockwise adjacent to the first air gap, a magnetic force injected outward to the longitudinal section of the virtual axis will be generated by the first magnetic field and the peripheral body of the armature coils based on the Fleming's left hand rule, or when observing from the longitudinal section of the virtual axis and the current in one of the armature coils flows clockwise adjacent to the first air gap, a magnetic force injected inward to the longitudinal section of the virtual axis will be generated by the first magnetic field and the peripheral body of the armature coils based on the Fleming's left hand rule.

Another feature of the DC dynamo as mentioned above is a DC generator, wherein almost all of the first magnetic lines of flux substantially and orthogonally pass through the first air gap from the armature coils to the first magnetic mechanism, and when observing from the longitudinal section of the virtual axis, the armature apparatus or the first magnetic mechanism is driven to make one of the armature coils adjacent to the first air gap be injected outward to the longitudinal section of the virtual axis and generate a counterclockwise induced electromotive force induced by the first magnetic field based on the Fleming's right hand rule, or when observing from the longitudinal section of the virtual axis, the armature apparatus or the first magnetic mechanism is driven to make one of the armature coils adjacent to the first air gap be injected inward to the longitudinal section of the virtual axis and generate a clockwise induced electromotive force induced by the first magnetic field based on the Fleming's right hand rule; wherein almost all of the first magnetic lines of flux substantially and orthogonally pass through the first air gap from the first magnetic mechanism to the armature coils, and when observing from the longitudinal section of the virtual axis, the armature apparatus or the first magnetic mechanism is driven to make one of the armature coils adjacent to the first air gap be injected outward to the longitudinal section of the virtual axis and generate a clockwise induced electromotive force induced by the first magnetic field based on the Fleming's right hand rule, or when observing from the longitudinal section of the virtual axis, the armature apparatus or the first magnetic mechanism is driven to make one of the armature coils adjacent to the first air gap be injected inward to the longitudinal section of the virtual axis and generate a counterclockwise induced electromotive force induced by the first magnetic field based on the Fleming's right hand rule.

Another feature of this invention provides another DC dynamo, comprising: a central axis; an armature apparatus with a first side and a second side opposite to each other, comprising a body and a plurality of armature coils, and wherein the body includes a central body coupled to the central axis, a peripheral body surrounding the central body and a plurality of middle bodies for connecting the central body and the peripheral body, and the peripheral body is wound by the armature coils, and the number of the armature coils is no less than 2; a first magnetic mechanism adjacent to the first side of the armature apparatus, comprising a first central area, a peripheral area surrounding the first central area, wherein part or whole of the first peripheral area corresponds to the armature coils, and there is a first air gap between the first magnetic mechanism and the armature coils; a first magnetic field generator for generating a closed-loop first magnetic field between the first magnetic mechanism and the first armature apparatus, wherein the magnetic lines of flux are flowing between the first magnetic mechanism and the first armature apparatus, and almost all of the magnetic lines of flux substantially and orthogonally pass through the first air gap between each of the armature coils and the first magnetic mechanism in the same direction to drive the armature apparatus and the first magnetic field to respectively rotate along a virtual axis along the same direction as that of the central axis; a second magnetic mechanism adjacent to the second side of the armature apparatus, comprising a second central area, a second peripheral area surrounding the second central area, wherein part or whole of the second peripheral area corresponds to the armature coils, and there is a second air gap between the second magnetic mechanism and the armature coils; a second magnetic field generator for generating a closed-loop second magnetic field between the second magnetic mechanism and the second armature apparatus, wherein the second magnetic lines of flux are flowing between the second magnetic mechanism and the second armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along a virtual axis along the same direction as that of the central axis; and a pair of armature electrodes with a substantially same polarity of electromotive force electrically interconnecting the armature coils and an outer system.

Another feature of the DC dynamo as mentioned above, wherein the first magnetic field generator is an electromagnet coil and/or a first permanent magnet, and the second magnetic field generator is an electromagnet coil and/or a first permanent magnet.

Another feature of the DC dynamo as mentioned above, wherein the first magnetic field generator is a first electromagnet coil located between the first magnetic mechanism and the armature apparatus to generate a closed-loop first magnetic field, wherein almost all of the first magnetic lines of flux substantially and orthogonally pass through the first air gap from the armature coils to the first magnetic mechanism or substantially and orthogonally pass through the first air gap from the first magnetic mechanism to the armature coils.

Another feature of the DC dynamo as mentioned above, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

Another feature of the DC dynamo as mentioned above, wherein the second magnetic field generator is a second electromagnet coil located between the second magnetic mechanism and the armature apparatus to generate a closed-loop second magnetic field, wherein almost all of the second magnetic lines of flux substantially and orthogonally pass through the second air gap from the armature coils to the second magnetic mechanism or substantially and orthogonally pass through the second air gap from the second magnetic mechanism to the armature coils.

Another feature of the DC dynamo as mentioned above, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

Another feature of the DC dynamo as mentioned above, wherein the armature apparatus is a rotor, and the first magnetic mechanism and the second magnetic mechanism are stators.

Another feature of the DC dynamo as mentioned above, wherein the armature apparatus is a stator, and the first magnetic mechanism and the second magnetic mechanism are rotors.

Another feature of the DC dynamo as mentioned above, wherein the first magnetic lines of flux and the second magnetic lines of flux are of different clockwises, and the DC dynamo further comprises a jointing mechanism outside the first and the second peripheral areas to join the first and the second magnetic mechanisms as a whole.

Another feature of the DC dynamo as mentioned above, wherein the jointing mechanism is made of a magnetic material or a non-magnetic material.

Another feature of the DC dynamo as mentioned above is a DC motor, wherein almost all of the first magnetic lines of flux substantially and orthogonally pass through the first air gap from the armature coils to the first magnetic mechanism, and almost all of the second magnetic lines of flux substantially and orthogonally pass through the second air gap from the armature coils to the second magnetic mechanism, and when observing from the longitudinal section of the virtual axis and the current in one of the armature coils flows counterclockwise adjacent to the first air gap and the second air gap, a magnetic force injected inward to the longitudinal section of the virtual axis will be generated by the first magnetic field, the second magnetic field and the peripheral body of the armature coils based on the Fleming's left hand rule, or when observing from the longitudinal section of the virtual axis and the current in one of the armature coils flows clockwise adjacent to the first air gap and the second air gap, a magnetic force injected outward to the longitudinal section of the virtual axis will be generated by the first magnetic field, the second magnetic field and the peripheral body of the armature coils based on the Fleming's left hand rule; wherein almost all of the first magnetic lines of flux substantially and orthogonally pass through the first air gap from the first magnetic mechanism to the armature coils, and almost all of the second magnetic lines of flux substantially and orthogonally pass through the second air gap from the second magnetic mechanism to the armature coils, and when observing from the longitudinal section of the virtual axis and the current in one of the armature coils flows counterclockwise adjacent to the first air gap and the second air gap, a magnetic force injected outward to the longitudinal section of the virtual axis will be generated by the first magnetic field, the second magnetic field and the peripheral body of the armature coils based on the Fleming's left hand rule, or when observing from the longitudinal section of the virtual axis and the current in one of the armature coils flows clockwise adjacent to the first air gap and the second air gap, a magnetic force injected inward to the longitudinal section of the virtual axis will be generated by the first magnetic field, the second magnetic field and the peripheral body of the armature coils based on the Fleming's left hand rule.

Another feature of the DC dynamo as mentioned above is a DC generator, wherein almost all of the first magnetic lines of flux substantially and orthogonally pass through the first air gap from the armature coils to the first magnetic mechanism, and almost all of the second magnetic lines of flux substantially and orthogonally pass through the second air gap from the armature coils to the second magnetic mechanism, and when observing from the longitudinal section of the virtual axis, the armature apparatus or the first magnetic mechanism, the second magnetic mechanism is driven to make one of the armature coils adjacent to the first air gap or the second air gap be injected outward to the longitudinal section of the virtual axis and generate a counterclockwise induced electromotive force induced by the first magnetic field or the second magnetic field based on the Fleming's right hand rule, or when observing from the longitudinal section of the virtual axis, the armature apparatus or the first magnetic mechanism, the second magnetic mechanism is driven to make one of the armature coils adjacent to the first air gap or the second air gap be injected inward to the longitudinal section of the virtual axis and generate a clockwise induced electromotive force induced by the first magnetic field or the second magnetic field based on the Fleming's right hand rule; wherein almost all of the first magnetic lines of flux substantially and orthogonally pass through the first air gap from the first magnetic mechanism to the armature coils, and almost all of the second magnetic lines of flux substantially and orthogonally pass through the second air gap from the first magnetic mechanism to the armature coils, and when observing from the longitudinal section of the virtual axis, the armature apparatus or the first magnetic mechanism, the second magnetic field is driven to make one of the armature coils adjacent to the first air gap or the second air gap be injected outward to the longitudinal section of the virtual axis and generate a clockwise induced electromotive force induced by the first magnetic field or the second magnetic field based on the Fleming's right hand rule, or when observing from the longitudinal section of the virtual axis, the armature apparatus or the first magnetic mechanism, the second mechanism is driven to make one of the armature coils adjacent to the first air gap or the second air gap be injected inward to the longitudinal section of the virtual axis and generate a counterclockwise induced electromotive force induced by the first magnetic field or the second magnetic field based on the Fleming's right hand rule.

BRIEF DESCRIPTION OF THE DRAWINGS

FIG. 1C' is a cross-sectional view of the DC dynamo 10' of the embodiments 2 along the sectional line I-I'.

FIG. 1C" is a cross-sectional view of the DC dynamo 10" of the embodiments 3 along the sectional line I-I'.

FIG. 2C' is a cross-sectional view of the DC dynamo 20' of the embodiments 5 along the sectional line II-II'.

FIG. 2C" is a cross-sectional view of the DC dynamo 20" of the embodiments 6 along the sectional line II-II'.

FIG. 3C' is a cross-sectional view of the DC dynamo 30' of the embodiments 8 along the sectional line III-III'.

FIG. 3C" is a cross-sectional view of the DC dynamo 30" of the embodiments 9 along the sectional line I-I'.

FIG. 4C' is a cross-sectional view of the DC dynamo 40' of the embodiments 11 along the sectional line IV-IV'.

FIG. 4C" is a cross-sectional view of the DC dynamo 40" of the embodiments 12 along the sectional line IV-IV'.

DETAILED DESCRIPTION OF THE INVENTION

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

Embodiments

Figure 1A:
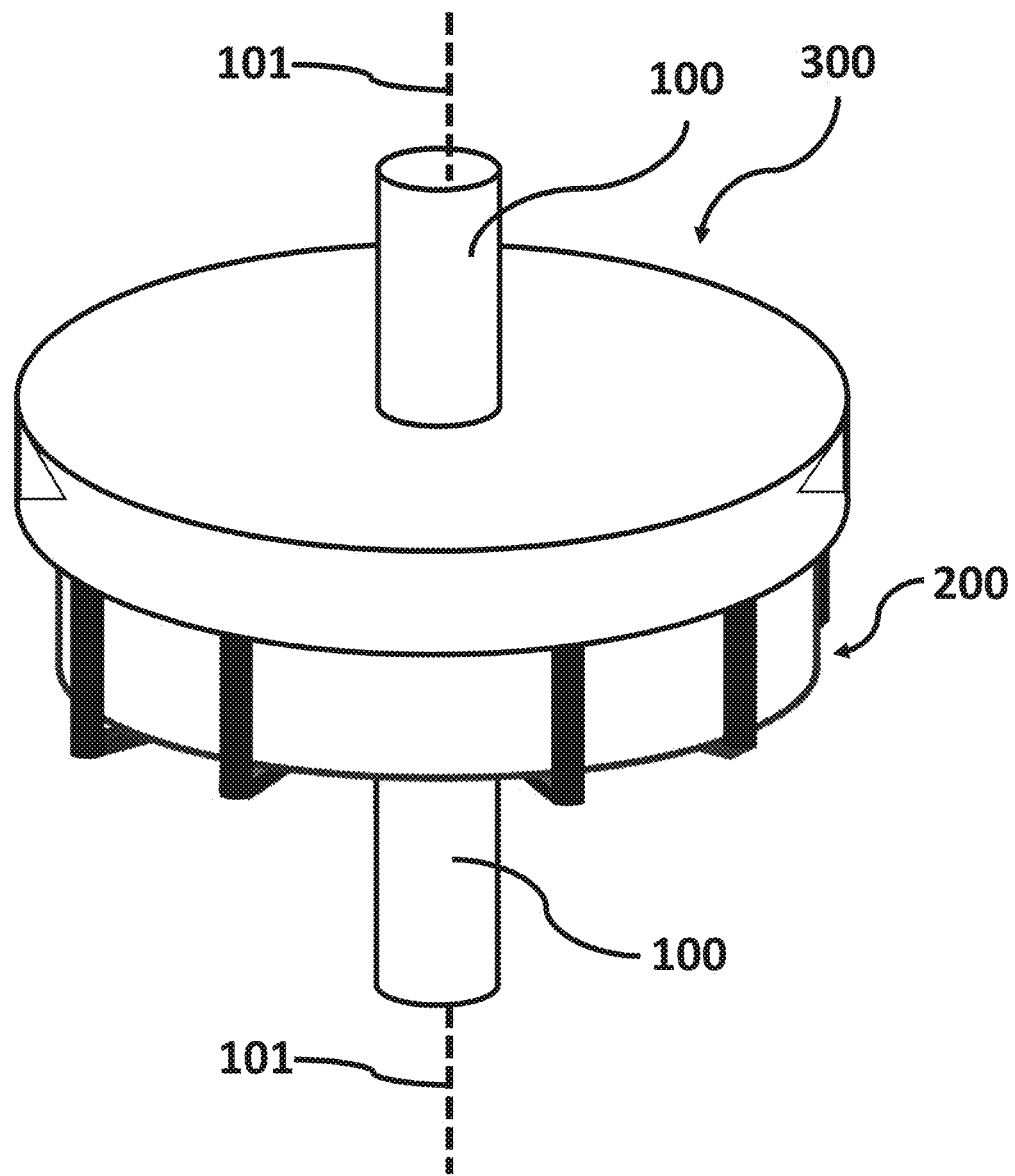
FIG. 1A is a stereoscopic assembly drawing of the DC dynamo 10, 10' and 10" of the embodiments 1, 2, and 3 according to this present invention.

First, please refer to FIG. 1A illustrating a stereoscopic assembly drawing of the DC dynamo 10, 10' and 10" of the embodiments 1, 2, and 3 according to this present invention, and 1B illustrating a stereoscopic exploded drawing of the DC dynamo 10, 10' and 10" as shown in FIG. 1A.

As showing in FIG. 1A, the DC dynamo 10, 10' and 10" comprises a central axis 100, an armature apparatus 200 and a first magnetic mechanism 300, wherein the armature apparatus 200 and the first magnetic mechanism 300 respectively rotate along a virtual axis 101.

Figure 1B:
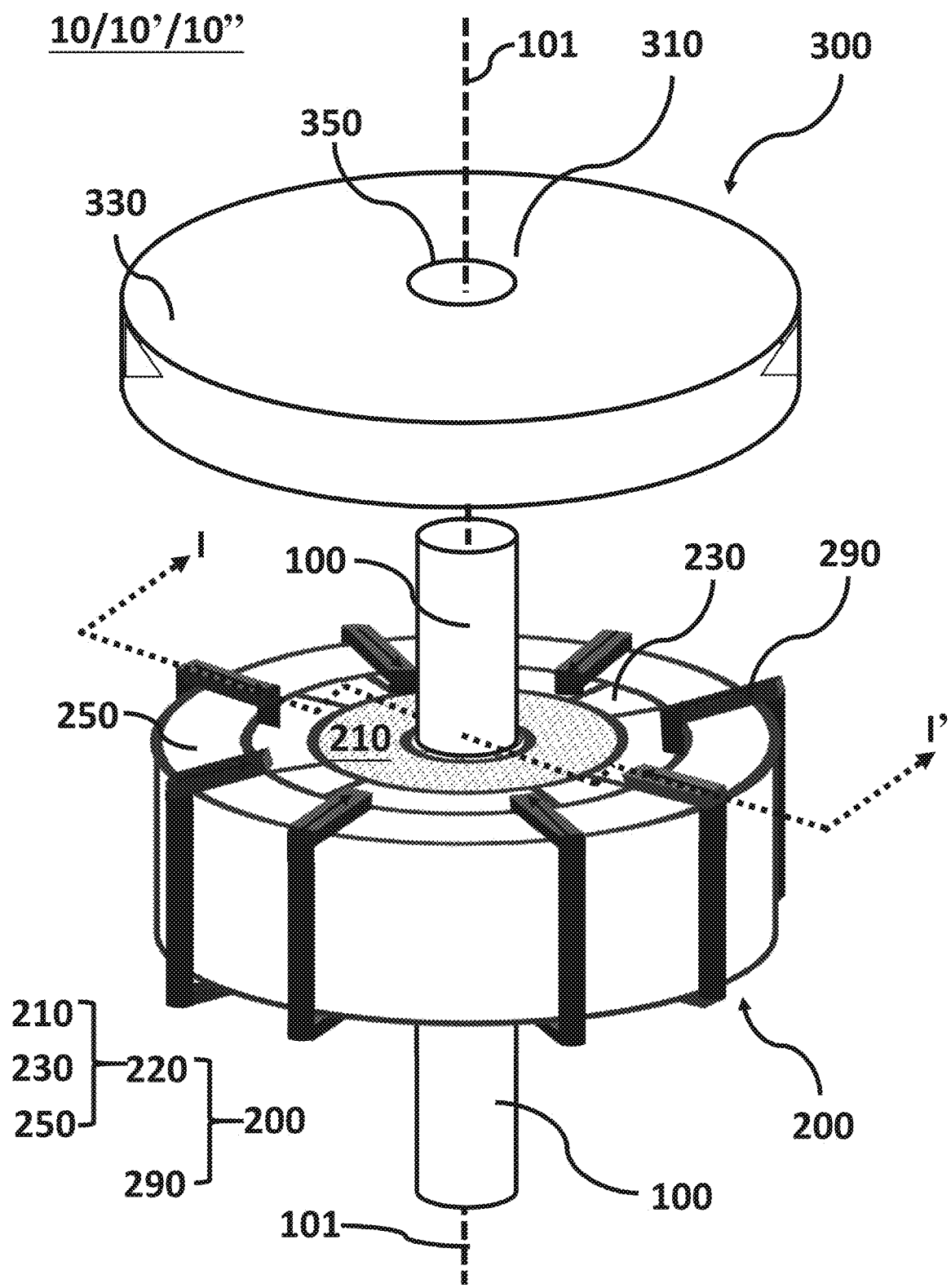
FIG. 1B is a stereoscopic exploded drawing of the DC dynamo 10, 10' and 10" as shown in FIG. 1A.

As showing in FIG. 1B, the armature apparatus 200 has a first side (not labeled) and a second side (not labeled) opposite to each other, and comprises a body 20 and a plurality of armature coils 290, and wherein the body 220 includes a central body 210 coupled to the central axis 100, a peripheral body 250 surrounding the central body 210 and a plurality of middle bodies 230 for connecting the central body 210 and the peripheral body 250, and the peripheral body 250 is wound by the armature coils 290, and the number of the armature coils 290 is no less than 2. As shown in FIG. 1B, the first magnetic mechanism 300 is adjacent to the first side of the armature apparatus 200, and comprises a first central area 310, a first peripheral area 330 surrounding the first central area 310, wherein part or whole of the first peripheral area 330 corresponds to the armature coils 290.

Figure 1C:
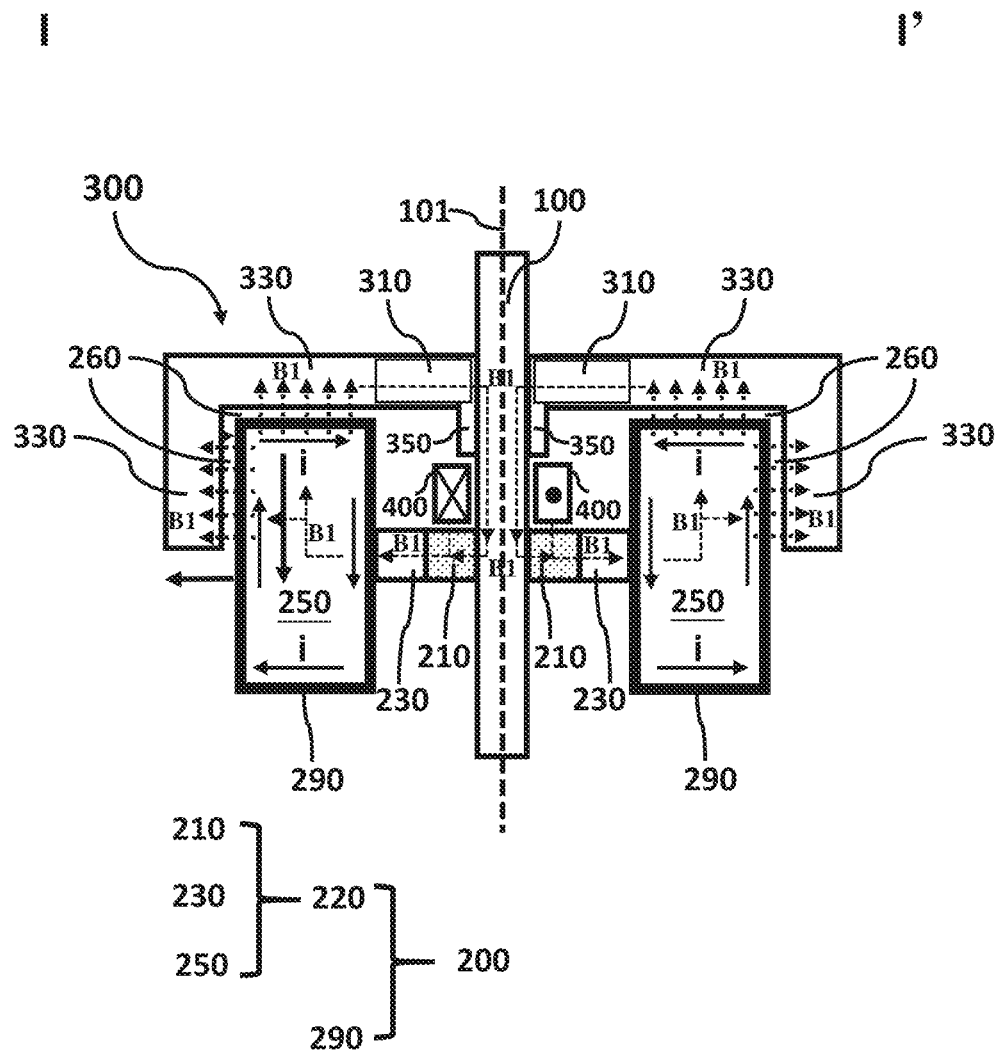
FIG. 1C is a cross-sectional view of the DC dynamo 10 of the embodiments 1 along the sectional line I-I'.
Figure 1C:
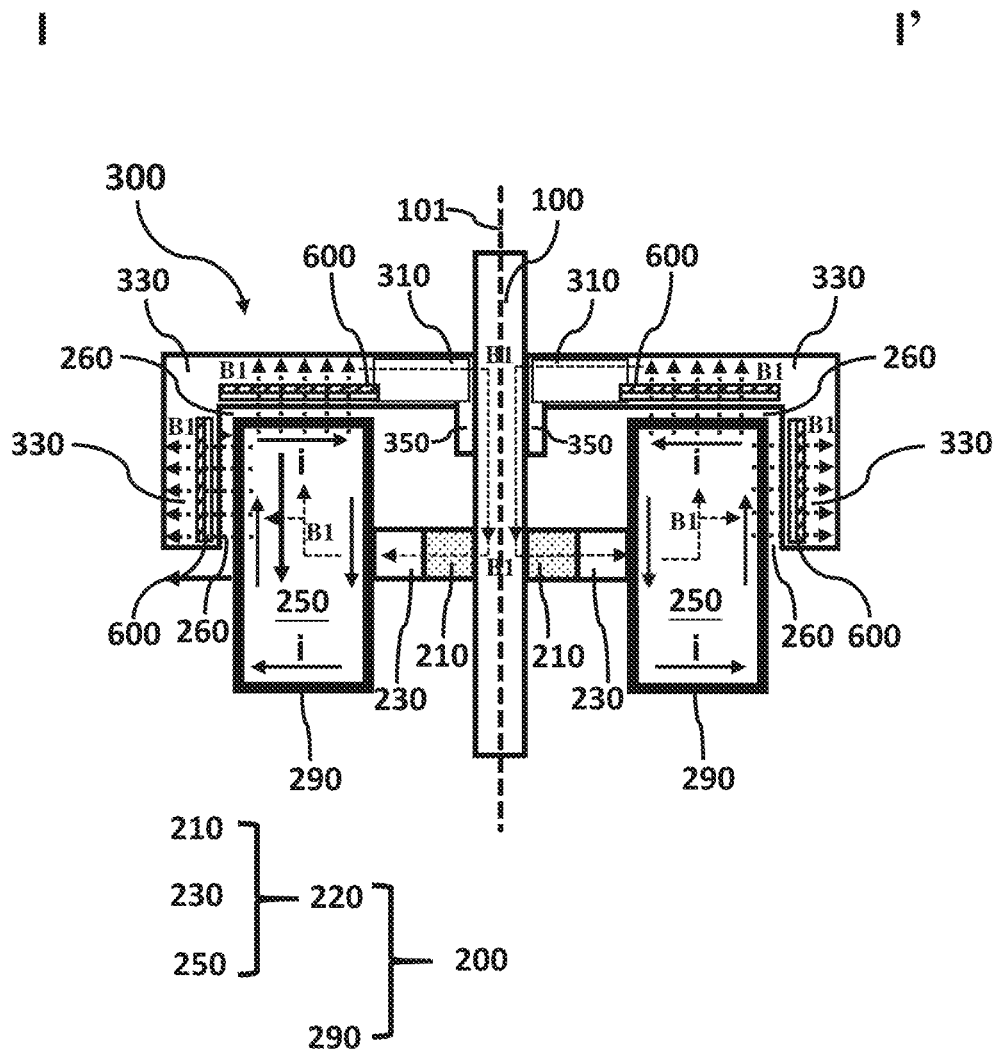

Next, please refer to FIG. 1C illustrates a cross-sectional view of the DC dynamo 10 of the embodiments 1 along the sectional line I-I'. As shown in FIG. 1C, there is a first air gap 260 between the first magnetic mechanism 300 and the armature coils 290, and the DC dynamo 10 of the embodiments 1 further comprises a first electromagnet coil 400 located between the first magnetic mechanism 300 and the armature apparatus 200 to generate a closed-loop first magnetic field B1, wherein almost all of the first magnetic lines of flux substantially and orthogonally pass through the first air gap 260 from the armature coils 290 to the first magnetic mechanism 300. Alternatively, almost all of the first magnetic lines of flux substantially and orthogonally pass through the first air gap 260 from the first magnetic mechanism 300 to the armature coils 290 in another embodiment of this present invention.

When the armature apparatus 200 is a rotor of the DC dynamo 10, the first magnetic mechanism 300 is a stator of the DC dynamo 10; and when the armature apparatus 200 is a stator of the DC dynamo 10, the first magnetic mechanism 300 is a rotator of the DC dynamo 10.

When the DC dynamo 10 of the embodiment 1 is a used as a DC motor, and almost all of the first magnetic lines of flux of the first magnetic field B1 substantially and orthogonally pass through the first air gap 260 from the armature coils 290 to the first magnetic mechanism 300, and when observing from the longitudinal section of the virtual axis 101 and the current i in one of the armature coils 290 flows counterclockwise adjacent to the first air gap 260, a magnetic force injected inward to the longitudinal section of the virtual axis 101 will be generated by the first magnetic field B1 and the peripheral body 250 of the armature coils 290 based on the Fleming's left hand rule, or when observing from the longitudinal section of the virtual axis 101 and the current i in one of the armature coils 290 flows clockwise adjacent to the first air gap 260, a magnetic force injected outward to the longitudinal section of the virtual axis 101 will be generated by the first magnetic field B1 and the peripheral body 250 of the armature coils 290 based on the Fleming's left hand rule.

When the DC dynamo 10 of the embodiment 1 is a used as a DC motor, and almost all of the first magnetic lines of flux of the first magnetic field B1 substantially and orthogonally pass through the first air gap 260 from the first magnetic mechanism 300 to the armature coils 290, and when observing from the longitudinal section of the virtual axis 101 and the current i in one of the armature coils 290 flows counterclockwise adjacent to the first air gap 260, a magnetic force injected outward to the longitudinal section of the virtual axis 101 will be generated by the first magnetic field B1 and the peripheral body 250 of the armature coils 290 based on the Fleming's left hand rule, or when observing from the longitudinal section of the virtual axis 101 and the current i in one of the armature coils 290 flows clockwise adjacent to the first air gap 260, a magnetic force injected inward to the longitudinal section of the virtual axis 101 will be generated by the first magnetic field B1 and the peripheral body 250 of the armature coils 290 based on the Fleming's left hand rule.

When the DC dynamo 10 of the embodiment 1 is used as a DC, generator, and almost all of the first magnetic lines of flux of the first magnetic field B1 substantially and orthogonally pass through the first air gap 260 from the armature coils 290 to first peripheral area 330 of the first magnetic mechanism 300, and when observing from the longitudinal section of the virtual axis 101, the armature apparatus 400 or the first magnetic mechanism 300 is driven to make one of the armature coils 290 adjacent to the first air gap 260 be injected outward to the longitudinal section of the virtual axis 101 and generate a counterclockwise induced electromotive force $\varepsilon_1$ induced by the first magnetic field B1 based on the Fleming's right hand rule, or when observing from the longitudinal section of the virtual axism 101, the armature apparatus 400 or the first magnetic mechanism 300 is driven to make one of the armature coils 290 adjacent to the first air gap 260 be injected inward to the longitudinal section of the virtual axis 101 and generate a clockwise induced electromotive force E$\varepsilon_1$ induced by the first magnetic field B1 based on the Fleming's right hand rule.

When the DC dynamo 10 of the embodiment 1 is used as a DC, generator, and almost all of the first magnetic lines of flux of the first magnetic field B1 substantially and orthogonally pass through the first air gap 260 from the first peripheral area 330 of the first magnetic mechanism 300 to the armature coils 290, and when observing from the longitudinal section of the virtual axis 101, the armature apparatus 400 or the first magnetic mechanism 300 is driven to make one of the armature coils 290 adjacent to the first air gap 260 be injected outward to the longitudinal section of the virtual axis 101 and generate a clockwise induced electromotive force $\varepsilon_1$ induced by the first magnetic field B1 based on the Fleming's right hand rule, or when observing from the longitudinal section of the virtual axism 101, the armature apparatus 400 or the first magnetic mechanism 300 is driven to make one of the armature coils 290 adjacent to the first air gap 260 be injected inward to the longitudinal section of the virtual axis 101 and generate a counterclockwise induced electromotive force $\varepsilon_1$ induced by the first magnetic field B1 based on the Fleming's right hand rule.

Next, please refer to FIG. 1C' illustrates a cross-sectional view of the DC dynamo 10' of the embodiments 2 along the sectional line I-I'. As shown in FIG. 1C', the configure of the DC dynamo 10' is similar to that of the DC dynamo 10 except a first permanent magnet 600 of the DC dynamo 10' is used to replace the first electromagnet coil 400 of the DC dynamo 10 to act as a first magnetic generator for generating the first magnetic field B1. The first permanent magnet 600 is located in for example but not limited to the first peripheral area 330 corresponding to the armature coils 290 to generate a closed-loop first magnetic field B1, wherein almost all of the first magnetic lines of flux of the first magnetic field B1 substantially and orthogonally pass through the first air gap 260 from the armature coils 290 to the first peripheral area 330 as shown in FIG. 1C'. Alternatively, almost all of the first magnetic lines of flux of the first magnetic field B1 substantially and orthogonally pass through the first air gap 260 from the first peripheral area 330 to the armature coils 290 in another embodiment of this present invention.

The DC dynamo 10' of the embodiments 2 can also be used as a DC motor or a DC generator as above-mentioned embodiment 1.

Next, please refer to FIG. 1C" illustrates a cross-sectional view of the DC dynamo 10" of the embodiments 3 along the sectional line I-I'. As shown in FIG. 1C", the configure of the DC dynamo 10" is similar to that of the DC dynamos 10 and 10' except both the first electromagnet coil 400 of the DC dynamo 10 and the first permanent magnet 600 of the DC dynamo 10' are used to act as a first magnetic generator for generating the first magnetic field B1. As shown in FIG. 1C", almost all of the first magnetic lines of flux of the first magnetic field B1 substantially and orthogonally pass through the first air gap 260 from the armature coils 290 to the first peripheral area 330. Alternatively, almost all of the first magnetic lines of flux of the first magnetic field B1 substantially and orthogonally pass through the first air gap 260 from the first peripheral area 330 to the armature coils 290 in another embodiment of this present invention.

The DC dynamo 10" of the embodiments 3 can also be used as a DC motor or a DC generator as above-mentioned embodiments 1 and 2.

The DC dynamo 10, 10' 10" according to the embodiments 1, 2 and 3 of this invention, can further comprise a pair of armature electrodes (not shown) with a substantially same polarity of electromotive force electrically interconnecting the armature coils and an outer system (no shown).

The DC dynamo 10, 10' 10" according to the embodiments 1, 2 and 3 of this invention, the first central area 310 of the first magnetic mechanism 300 can further comprise a first magnetic mechanism bearing 350 and the central axis 100 is running through the first magnetic mechanism bearing 350 to make the armature 200 and the first magnetic mechanism 300 respectively rotate relative to the first magnetic mechanism bearing 350.

The DC dynamo 10, 10' 10" according to the embodiments 1, 2 and 3 of this invention can further comprise a plurality of balls located between the first magnetic mechanism bearing 350 and the central axis 100.

Figure 2A:
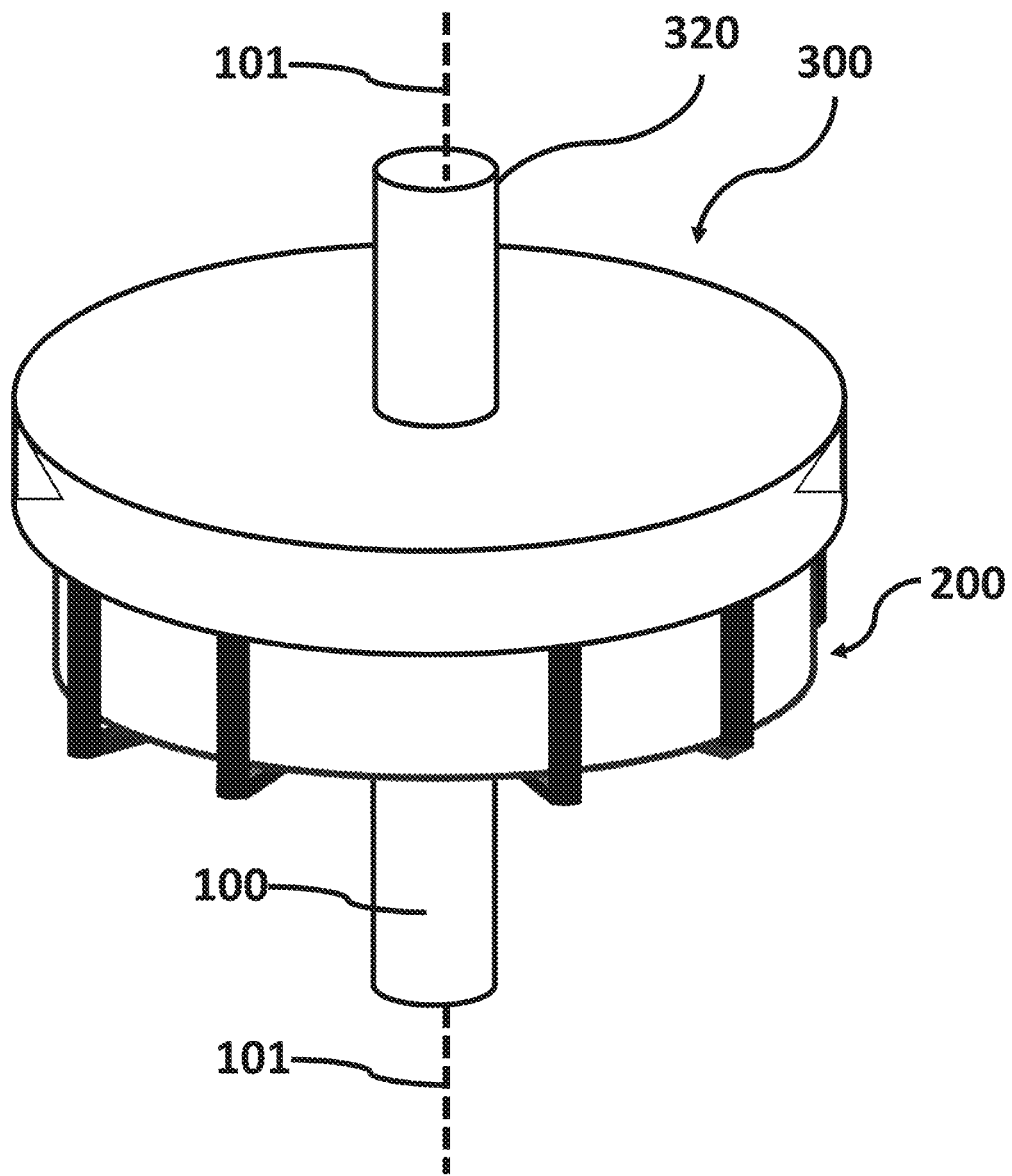
FIG. 2A is a stereoscopic assembly drawing of the DC dynamo 20, 20' and 20" of the embodiments 4, 5, and 6 according to this present invention.
Figure 2B:
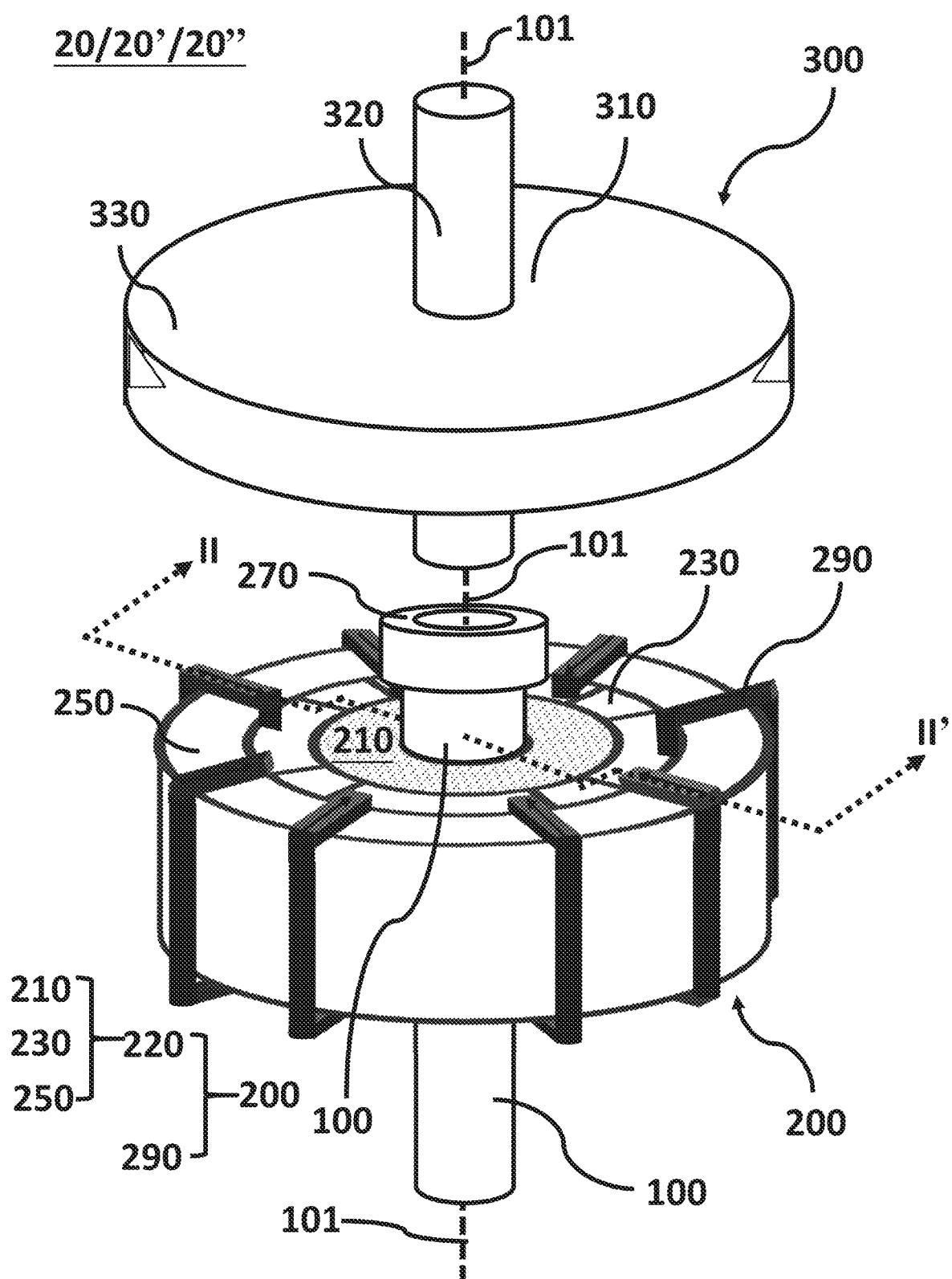
FIG. 2B is a stereoscopic exploded drawing of the DC dynamo 20, 20' and 20" as shown in FIG. 2A.

Next, please refer to FIG. 2A illustrating a stereoscopic assembly drawing of the DC dynamo 20, 20' and 20" of the embodiments 4, 5, and 6 according to this present invention, and 2B illustrating a stereoscopic exploded drawing of the DC dynamo 20, 20' and 20" as shown in FIG. 2A.

Figure 2C:
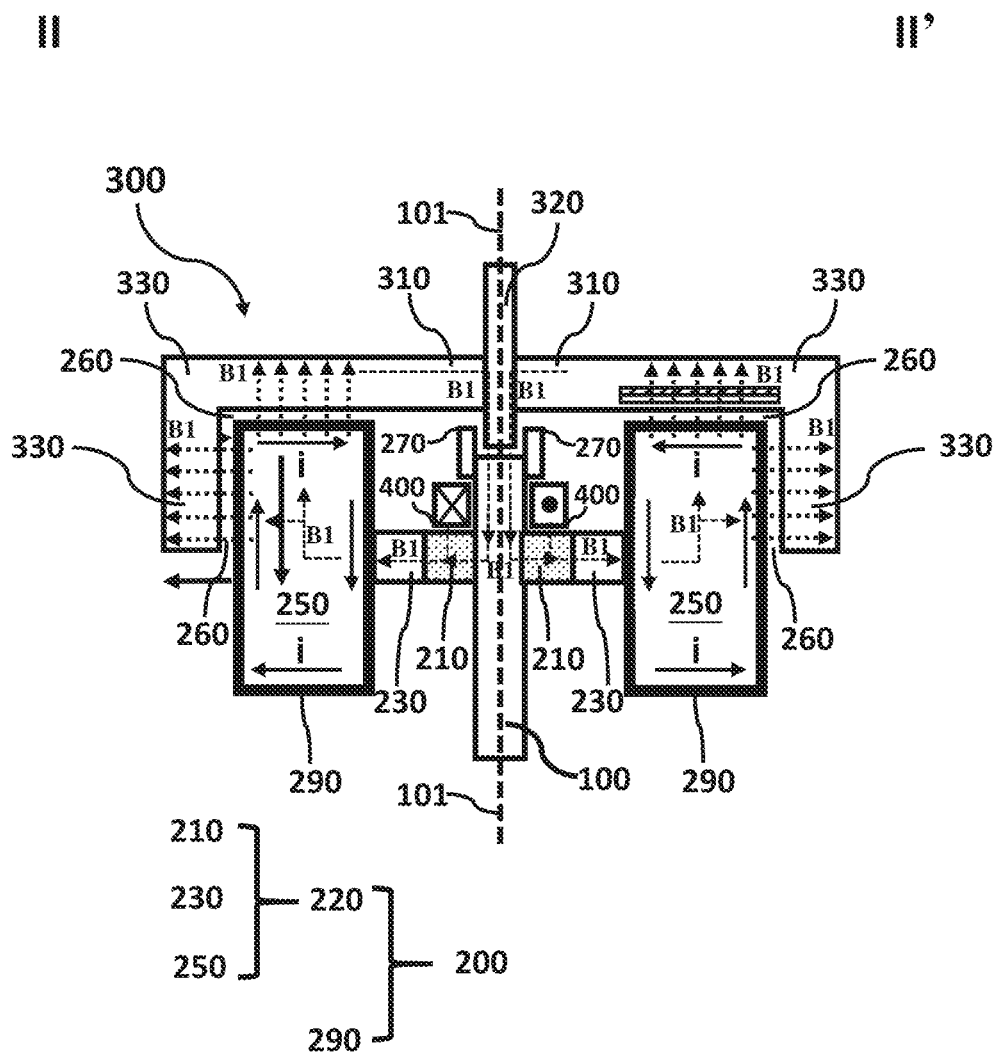
FIG. 2C is a cross-sectional view of the DC dynamo 20 of the embodiments 4 along the sectional line II-II'.
Figure 2C:
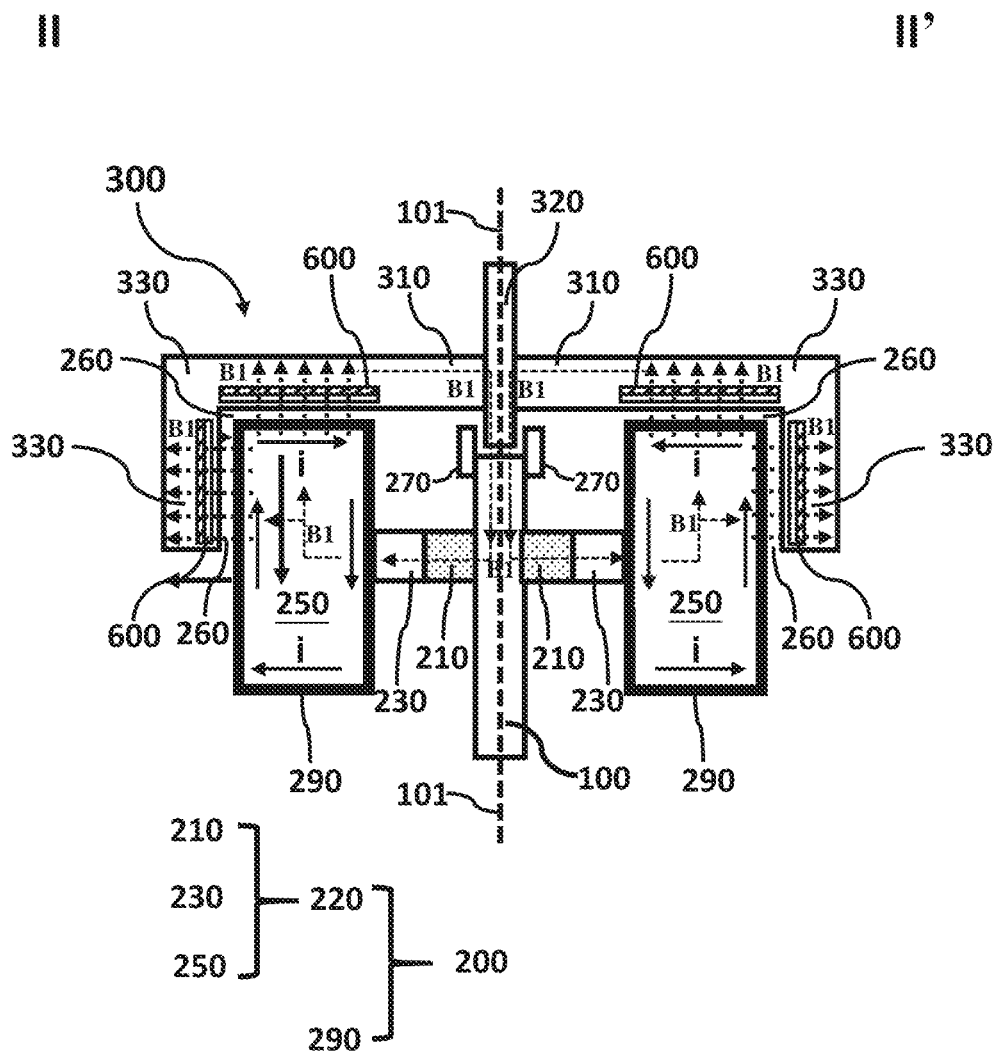

Next, please refer to FIG. 2C illustrates a cross-sectional view of the DC dynamo 20 of the embodiments 4 along the sectional line II-II'. As shown in FIG. 2C, the configure of the DC dynamo 20 is similar to that of the DC dynamo 10 except the first magnetic mechanism 300 of the DC dynamo 20 further comprises a first rotatory axis 320, and the end of the first rotatory axis 320 nearby the first magnetic mechanism 300 further includes a first central axis bearing 270, and the first rotatory axis 320 is running through the first central axis bearing 270 to make the armature 200 rotate relatively to the first magnetic mechanism 300 by means of the first rotatory axis 320 and the first central axis bearing 270.

The DC dynamo 20 of the embodiments 4 can also be used as a DC motor or a DC generator as above-mentioned embodiment 1.

Next, please refer to FIG. 2C' illustrates a cross-sectional view of the DC dynamo 20' of the embodiments 5 along the sectional line II-II'. As shown in FIG. 2C', the configure of the DC dynamo 20' is similar to that of the DC dynamo 10' except the first magnetic mechanism 300 of the DC dynamo 20' further comprises a first rotatory axis 320, and the end of the first rotatory axis 320 nearby the first magnetic mechanism 300 further includes a first central axis bearing 270, and the first rotatory axis 320 is running through the first central axis bearing 270 to make the armature 200 rotate relatively to the first magnetic mechanism 300 by means of the first rotatory axis 320 and the first central axis bearing 270.

The DC dynamo 20' of the embodiments 5 can also be used as a DC motor or a DC generator as above-mentioned embodiment 2.

Next, please refer to FIG. 2C" illustrates a cross-sectional view of the DC dynamo 20" of the embodiments 6 along the sectional line II-II'. As shown in FIG. 2C", the configure of the DC dynamo 20" is similar to that of the DC dynamo 10" except the first magnetic mechanism 300 of the DC dynamo 20" further comprises a first rotatory axis 320, and the end of the first rotatory axis 320 nearby the first magnetic mechanism 300 further includes a first central axis bearing 270, and the first rotatory axis 320 is running through the first central axis bearing 270 to make the armature 200 rotate relatively to the first magnetic mechanism 300 by means of the first rotatory axis 320 and the first central axis bearing 270.

The DC dynamo 20″ of the embodiments 6 can also be used as a DC motor or a DC generator as above-mentioned embodiment 3.

The DC dynamo 20, 20′ 20″ according to the embodiments 4, 5 and 6 of this invention, can further comprise a pair of armature electrodes (not shown) with a substantially same polarity of electromotive force electrically interconnecting the armature coils and an outer system (no shown).

The DC dynamo 20, 20′ 20″ according to the embodiments 4, 5 and 6 of this invention, the first central area 310 of the first magnetic mechanism 300 can further comprise a first magnetic mechanism bearing 350 and the central axis 100 is running through the first magnetic mechanism bearing 350 to make the armature 200 rotate and the first magnetic mechanism 300 relatively rotate to the first magnetic mechanism bearing 350.

Figure 3A:
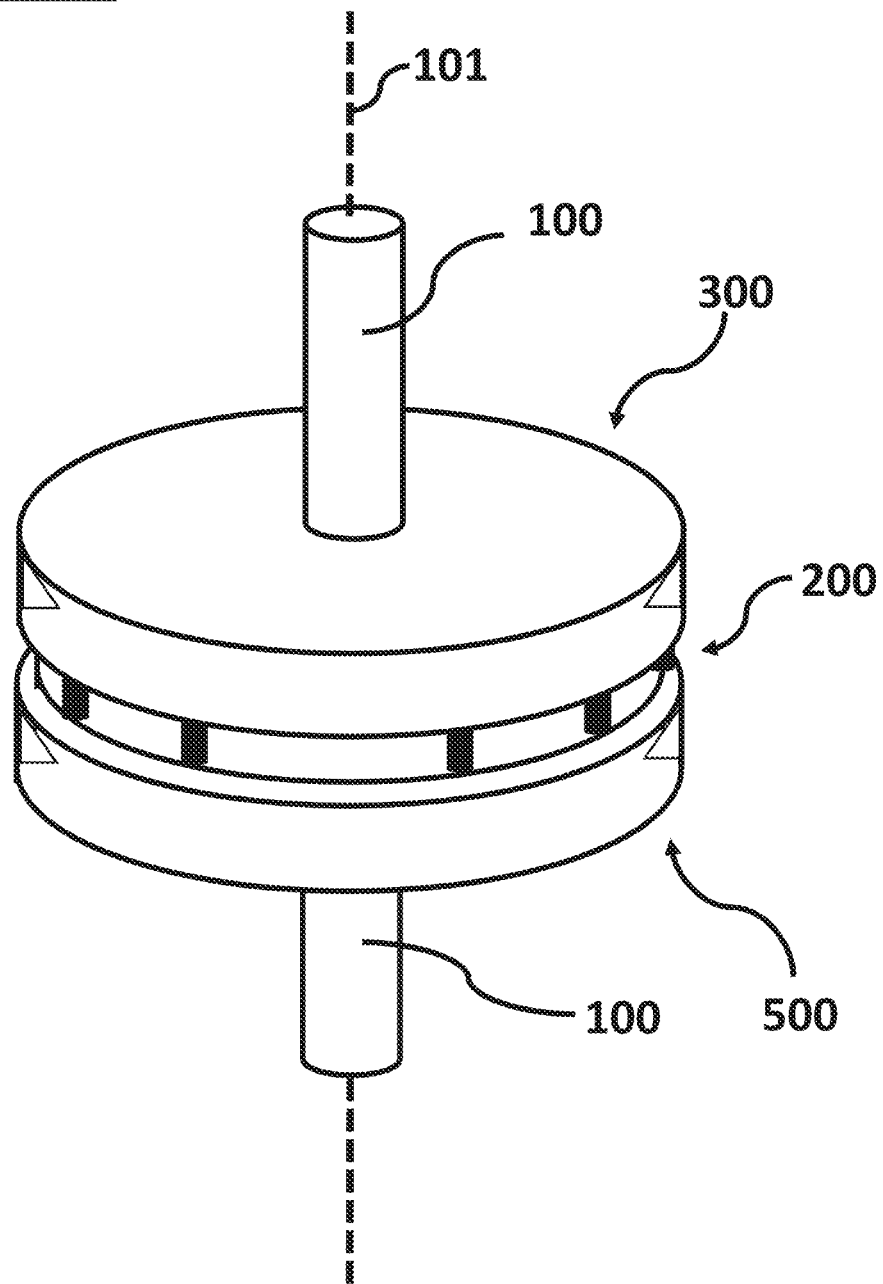
FIG. 3A is a stereoscopic assembly drawing of the DC dynamo 30, 30' and 30" of the embodiments 7, 8, and 9 according to this present invention.

Next, please refer to FIG. 3A illustrating a stereoscopic assembly drawing of the DC dynamo 30, 30′ and 30″ of the embodiments 7, 8, and 9 according to this present invention, and 3B illustrating a stereoscopic exploded drawing of the DC dynamo 30, 30′ and 30″ as shown in FIG. 3A.

As shown in FIG. 3A, the DC dynamo 30, 30′ and 30″ comprises a central axis 100, a armature 200, a first magnetic mechanism 300 and a second magnetic mechanism 500, wherein the armature 200, the first magnetic mechanism 300 and the second magnetic mechanism 500 respectively rotates relative to a virtual axis 101 symmetrical to the central axis 100.

Figure 3B:
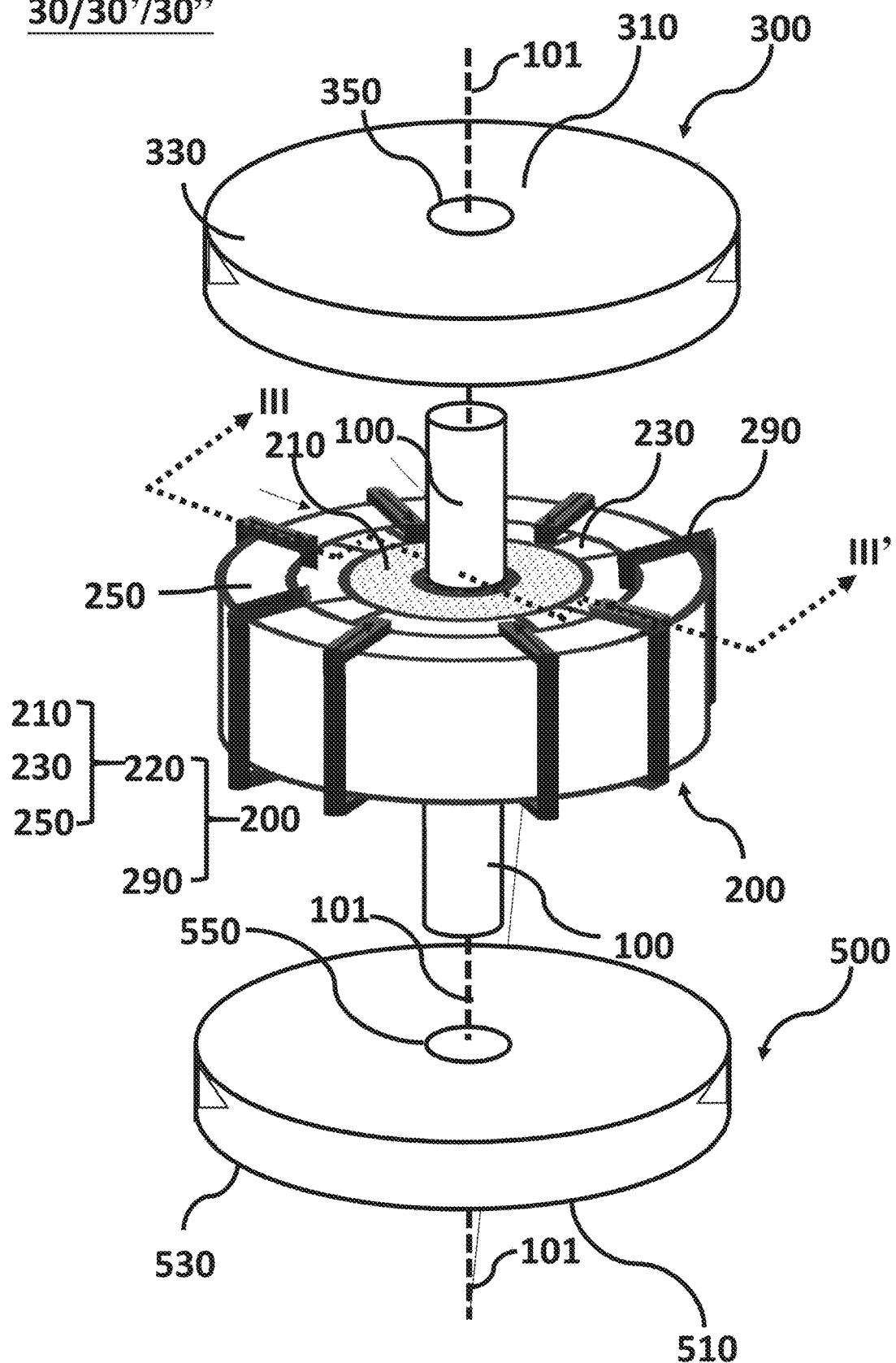
FIG. 3B is a stereoscopic exploded drawing of the DC dynamo 30, 30' and 30" as shown in FIG. 3A.

As showing in FIG. 3B, the armature apparatus 200 has a first side (not labeled) and a second side (not labeled) opposite to each other, and comprises a body 20 and a plurality of armature coils 290, and wherein the body 220 includes a central body 210 coupled to the central axis 100, a peripheral body 250 surrounding the central body 210 and a plurality of middle bodies 230 for connecting the central body 210 and the peripheral body 250, and the peripheral body 250 is wound by the armature coils 290, and the number of the armature coils 290 is no less than 2. As shown in FIG. 1B, the first magnetic mechanism 300 is adjacent to the first side of the armature apparatus 200, and comprises a first central area 310, a first peripheral area 330 surrounding the first central area 310, wherein part or whole of the first peripheral area 330 corresponds to the armature coils 290 of the armature apparatus 200, and the second magnetic mechanism 500 is adjacent to the second side of the armature apparatus 200, and comprises a second central area 510, a second peripheral area 530 surrounding the second central area 510, wherein part or whole of the second peripheral area 530 corresponds to the armature coils 290 of the armature apparatus 200.

Figure 3C:
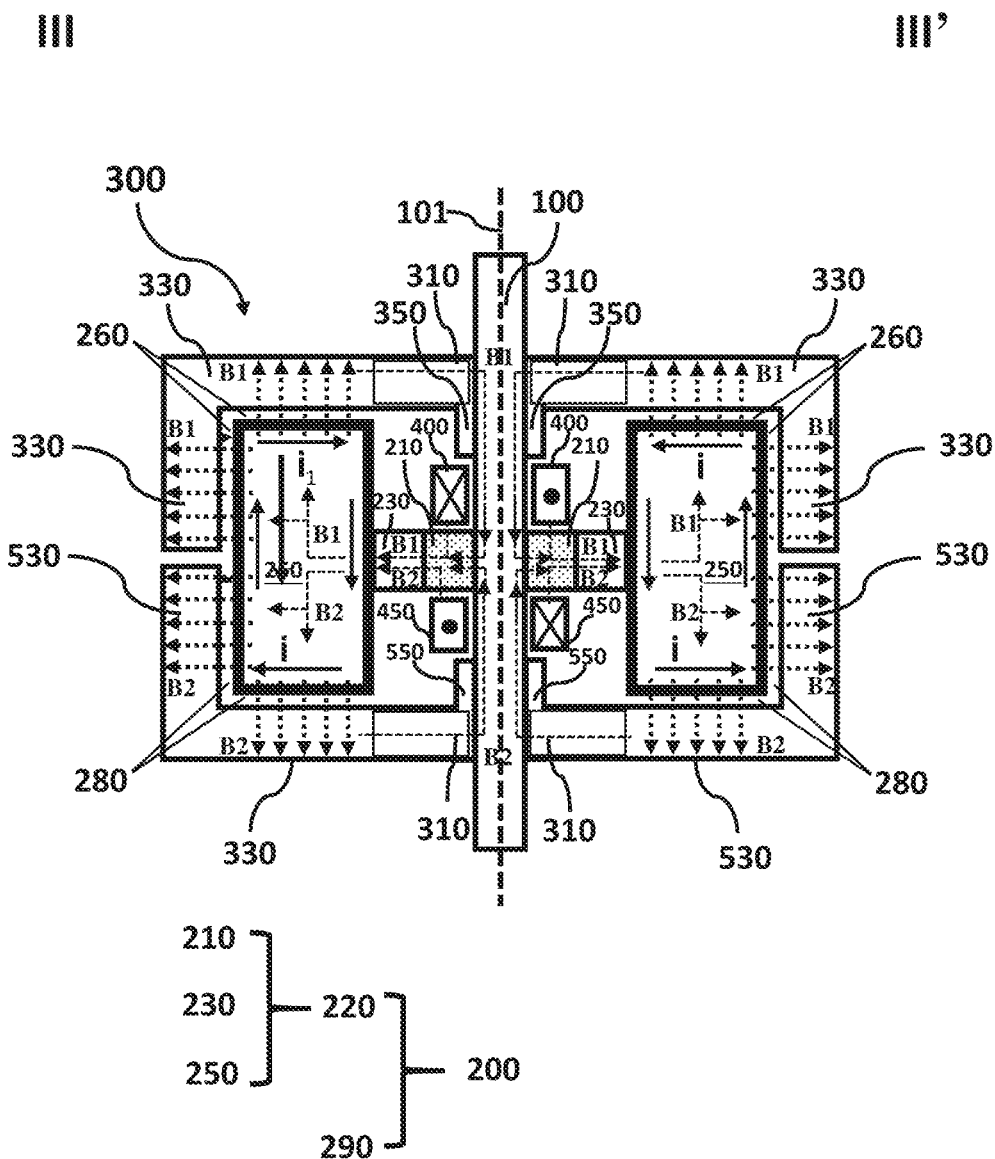
FIG. 3C is a cross-sectional view of the DC dynamo 30 of the embodiments 7 along the sectional line III-III'.
Figure 3C:
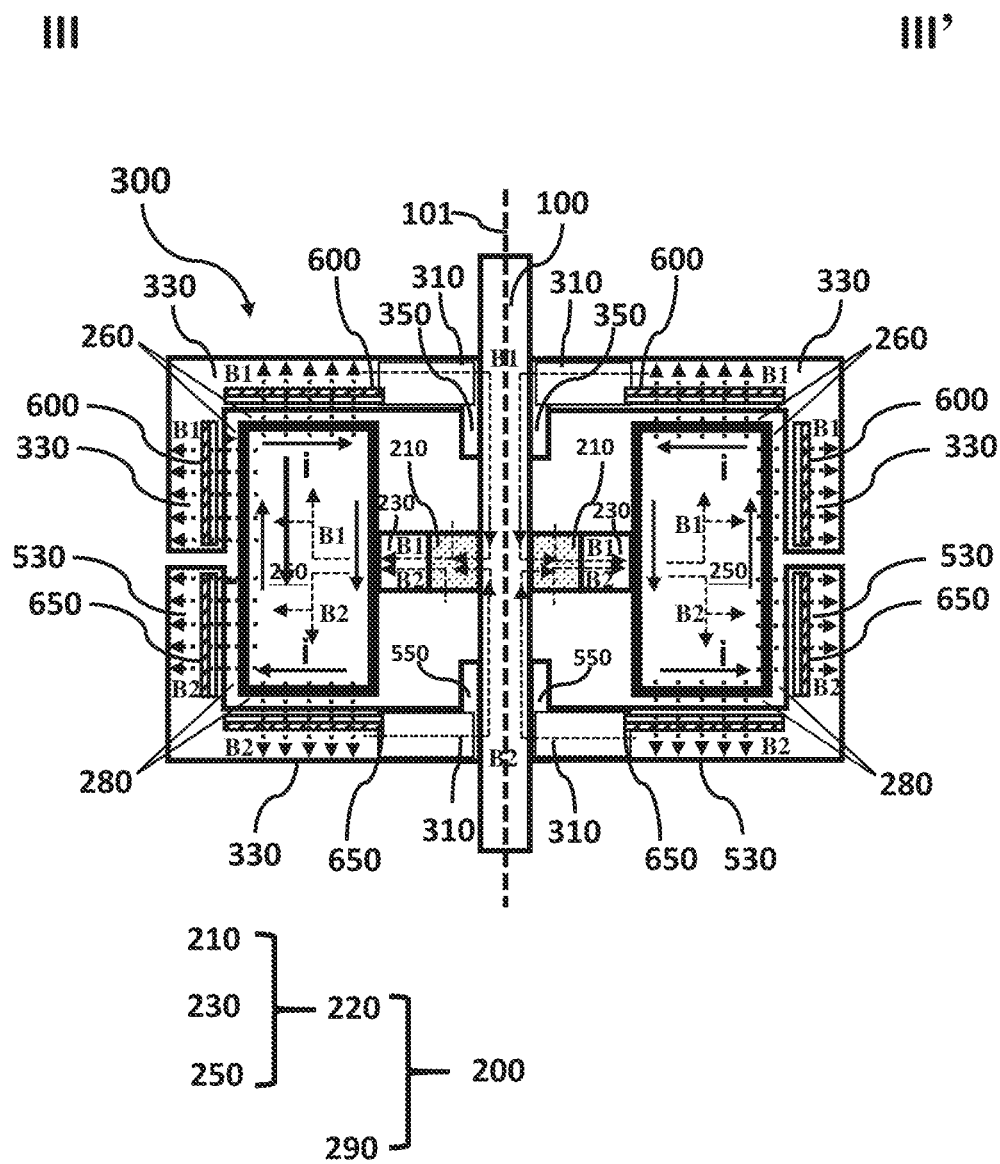

Next, please refer to FIG. 3C illustrates a cross-sectional view of the DC dynamo 30 of the embodiments 7 along the sectional line III-III′. As shown in FIG. 3C, there is a first air gap 260 between the first magnetic mechanism 300 and the armature coils 290 and there is a second air gap 280 between the second magnetic mechanism 500 and the armature coils 290, and the DC dynamo 30 of the embodiments 7 further comprises a first electromagnet coil 400 located between the first magnetic mechanism 300 and the armature apparatus 200 to generate a closed-loop first magnetic field B1 and a second electromagnet coil 450 located between the second magnetic mechanism 500 and the armature apparatus 200 to generate a closed-loop second magnetic field B2, wherein almost all of the first magnetic field lines of flux between the first magnetic mechanism 300 and the armature apparatus 200 along with the central axis 100 and substantially and orthogonally pass through the first air gap 260 from the first peripheral area 330 of the armature coils 290 to the first magnetic mechanism 300, and almost all of the second magnetic field lines of flux between the second magnetic mechanism 500 and the armature apparatus 200 and substantially and orthogonally pass through the second air gap 280 from the second peripheral area 530 of the armature coils 290 to the second magnetic mechanism 500. Alternatively, almost all of the first magnetic lines of flux substantially and orthogonally pass through the first air gap 260 from the first magnetic mechanism 300 to the first peripheral area 330 of the armature coils 290 and almost all of the second magnetic lines of flux substantially and orthogonally pass through the second air gap 280 from the second magnetic mechanism 500 to the second peripheral area 530 of the armature coils 290 in another embodiment of this present invention.

When the armature apparatus 200 is a rotor of the DC dynamo 30, the first magnetic mechanism 300 and the second magnetic mechanism 500 are stators of the DC dynamo 30; and when the armature apparatus 200 is a stator of the DC dynamo 30, the first magnetic mechanism 300 and the second magnetic mechanism 500 are rotators of the DC dynamo 30.

When the DC dynamo 30 of the embodiment 7 is a used as a DC motor, and almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500, and when observing from the longitudinal section of the virtual axis 101 and the current i in one of the armature coils 290 flows counterclockwise adjacent to the first air gap 260 and the second air gap 280, a magnetic force injected inward to the longitudinal section of the virtual axis 101 will be generated by the first magnetic field B1, the second magnetic field B2 and the peripheral body 250 of the armature coils 290 based on the Fleming's left hand rule, or when observing from the longitudinal section of the virtual axis 101 and the current i in one of the armature coils 290 flows clockwise adjacent to the first air gap 260 and the second air gap 280, a magnetic force injected outward to the longitudinal section of the virtual axis 101 will be generated by the first magnetic field B1, the second magnetic field B2 and the peripheral body 250 of the armature coils 290 based on the Fleming's left hand rule.

When the DC dynamo 30 of the embodiment 7 is a used as a DC motor, and almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the second peripheral area 530 of the second magnetic mechanism 500 to the armature coils 290, and when observing from the longitudinal section of the virtual axis 101 and the current i in one of the armature coils 290 flows counterclockwise adjacent to the first air gap 260 and the second air gap 280, a magnetic force injected outward to the longitudinal section of the virtual axis 101 will be generated by the first magnetic field B1, the second magnetic field B2 and the peripheral body 250 of the armature coils 290 based on the Fleming's left hand rule, or when observing from the longitudinal section of the virtual axis 101 and the current i in one of the armature coils 290 flows clockwise adjacent to the first air gap 260 and the second air gap 280, a magnetic force injected inward to the longitudinal section of the virtual axis 101 will be generated by the first magnetic field B1, the second magnetic field B2 and the peripheral body 250 of the armature coils 290 based on the Fleming's left hand rule.

When the DC dynamo 30 of the embodiment 7 is used as a DC, generator, and almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500, and when observing from the longitudinal section of the virtual axis 101, the armature apparatus 400 or the first magnetic mechanism 300, the second magnetic mechanism 500 is driven to make one of the armature coils 290 adjacent to the first air gap 260 or the second air gap 280 be injected outward to the longitudinal section of the virtual axis 101 and generate a counterclockwise induced electromotive force $\varepsilon_1$ induced by the first magnetic field B1 and the second magnetic field B2 based on the Fleming's right hand rule, or when observing from the longitudinal section of the virtual axism 101, the armature apparatus 400 or the first magnetic mechanism 300, the second magnetic mechanism 500 is driven to make one of the armature coils 290 adjacent to the first air gap 260 or the second air gap 280 be injected inward to the longitudinal section of the virtual axis 101 and generate a clockwise induced electromotive force $\varepsilon_1$ induced by the first magnetic field B1 and the second magnetic field B2 based on the Fleming's right hand rule.

When the DC dynamo 30 of the embodiment 7 is used as a DC, generator, and almost all of the first magnetic lines of flux of the first magnetic field B1 substantially and orthogonally pass through the first air gap 260 from the first peripheral area 330 of the first magnetic mechanism 300 to the armature coils 290, and almost all of the second magnetic lines of flux of the second magnetic field B2 substantially and orthogonally pass through the second air gap 280 from the second peripheral area 530 of the second magnetic mechanism 500 to the armature coils 290, and when observing from the longitudinal section of the virtual axis 101, the armature apparatus 400 or the first magnetic mechanism 300, the second magnetic mechanism 500 is driven to make one of the armature coils 290 adjacent to the first air gap 260 or the second air gap 280 be injected inward to the longitudinal section of the virtual axis 101 and generate a clockwise induced electromotive force $\varepsilon_1$ induced by the first magnetic field B1 and the second magnetic field B2 based on the Fleming's right hand rule, or when observing from the longitudinal section of the virtual axism 101, the armature apparatus 400 or the first magnetic mechanism 300, the second magnetic mechanism 500 is driven to make one of the armature coils 290 adjacent to the first air gap 260 or the second air gap 280 be injected outward to the longitudinal section of the virtual axis 101 and generate a counterclockwise induced electromotive force $\varepsilon_1$ induced by the first magnetic field B1 and the second magnetic field B2 based on the Fleming's right hand rule.

Next, please refer to FIG. 3C' illustrates a cross-sectional view of the DC dynamo 30' of the embodiments 8 along the sectional line III-III'. As shown in FIG. 3C', the configure of the DC dynamo 30' is similar to that of the DC dynamo 30 except a first permanent magnet 600 and a second permanent magnet 650 of the DC dynamo 30' are used to replace the first electromagnet coil 400 and the second electromagnet 450 of the DC dynamo 10 to act as a first magnetic generator for generating the first magnetic field B1 and a second magnetic generator for generating the second magnetic field B2. The first permanent magnet 600 is located in for example but not limited to the first peripheral area 330 corresponding to the armature coils 290 to generate a closed-loop first magnetic field B1, and the second permanent magnet 650 is located in for example but not limited to the second peripheral area 530 corresponding to the armature coils 290 to generate a closed-loop second magnetic field B2, wherein almost all of the first magnetic lines of flux of the first magnetic field B1 substantially and orthogonally pass through the first air gap 260 from the armature coils 290 to the first peripheral area 330 and almost all of the second magnetic lines of flux of the second magnetic field B2 substantially and orthogonally pass through the second air gap 280 from the armature coils 290 to the second peripheral area 530 as shown in FIG. 3C'. Alternatively, almost all of the first magnetic lines of flux of the first magnetic field B1 substantially and orthogonally pass through the first air gap 260 from the first peripheral area 330 to the armature coils 290 and almost all of the second magnetic lines of flux of the second magnetic field B2 substantially and orthogonally pass through the second air gap 280 from the first peripheral area 530 to the armature coils 290 in another embodiment of this present invention.

The DC dynamo 30' of the embodiments 8 can also be used as a DC motor or a DC generator as above-mentioned embodiment 7.

Next, please refer to FIG. 3C'' illustrates a cross-sectional view of the DC dynamo 30'' of the embodiments 9 along the sectional line III-III'. As shown in FIG. 3C'', the configure of the DC dynamo 30'' is similar to that of the DC dynamos 30 and 30' except both the first electromagnet coil 400 and the second electromagnet coil 450 of the DC dynamo 30 and the first permanent magnet 600 and the second permanent magnet 650 of the DC dynamo 30' are used to act as a first magnetic generator for generating the first magnetic field B1 and a second magnetic generator for generating the first magnetic field B2. As shown in FIG. 3C'', almost all of the first magnetic lines of flux of the first magnetic field B1 substantially and orthogonally pass through the first air gap 260 from the armature coils 290 to the first peripheral area 330, and almost all of the second magnetic lines of flux of the second magnetic field B2 substantially and orthogonally pass through the second air gap 280 from the armature coils 290 to the second peripheral area 530. Alternatively, almost all of the first magnetic lines of flux of the first magnetic field B1 substantially and orthogonally pass through the first air gap 260 from the first peripheral area 330 to the armature coils 290, and almost all of the second magnetic lines of flux of the first magnetic field B2 substantially and orthogonally pass through the second air gap 280 from the second peripheral area 530 to the armature coils 290 in another embodiment of this present invention.

The DC dynamos 30'' of the embodiments 9 can also be used as a DC motor or a DC generator as the DC dynamos 30 and 30' of above-mentioned embodiments 7 and 8.

The DC dynamos 30, 30' 30'' according to the embodiments 7, 8 and 9 of this invention, can further comprise a pair of armature electrodes (not shown) with a substantially same polarity of electromotive force electrically interconnecting the armature coils and an outer system (no shown).

The DC dynamos 30, 30' 30" according to the embodiments 7, 8 and 9 of this invention, the first central area 310 of the first magnetic mechanism 300 can further comprise a first magnetic mechanism bearing 350 and the second central area 510 of the second magnetic mechanism 500 can further comprise a second magnetic mechanism bearing 550, and the central axis 100 is running through the first magnetic mechanism bearing 350 and the second magnetic mechanism bearing 550 to make the armature 200 and the first magnetic mechanism 300, the second magnetic mechanism 500 respectively rotate relative to the first magnetic mechanism bearing 350 and the second magnetic mechanism bearing 550.

The DC dynamos 30, 30' 30" according to the embodiments 7, 8 and 9 of this invention can further comprise a plurality of balls located between the first, second magnetic mechanism bearings 350, 350 and the central axis 100.

The DC dynamos 30, 30' 30" according to the embodiments 7, 8 and 9 of this invention, wherein the first magnetic lines of flux and the second magnetic lines of flux are of different clockwise and further comprise a jointing mechanism (not shown) made of a magnetic material or a non-magnetic material outside the firs peripheral area 330 and the second peripheral area 530 to join the first magnetic mechanism 300 and the second magnetic mechanism 500 as a whole. Accordingly to another embodiments of this invention, the first electromagnetic coils 400 and/or the first permanent magnet 600 is/are used as the first magnetic field generator, and the second electromagnetic coils 450 and/or the second permanent magnet 650 is/are used as the second magnetic field generator.

Figure 4A:
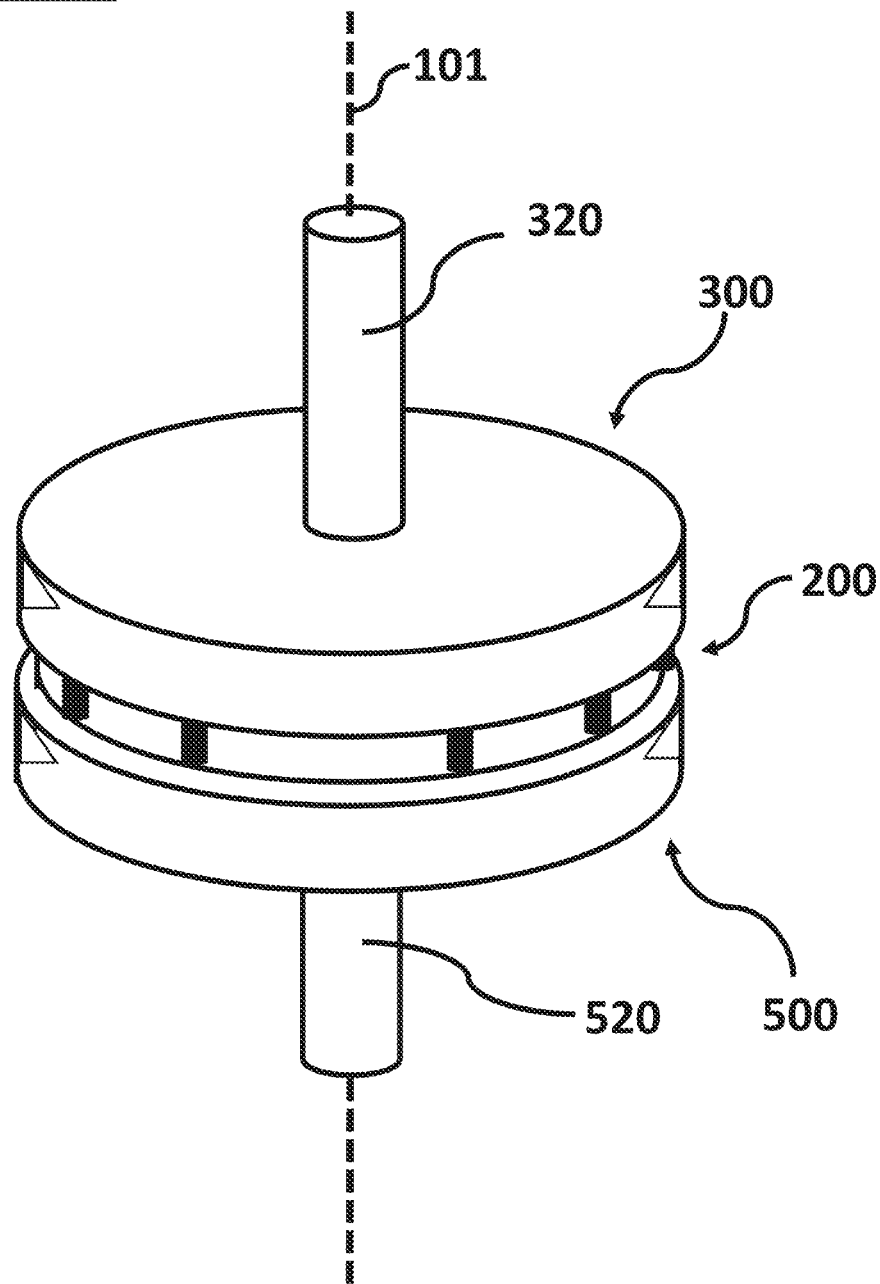
FIG. 4A is a stereoscopic assembly drawing of the DC dynamo 40, 40' and 40" of the embodiments 10, 11, and 12 according to this present invention.
Figure 4B:
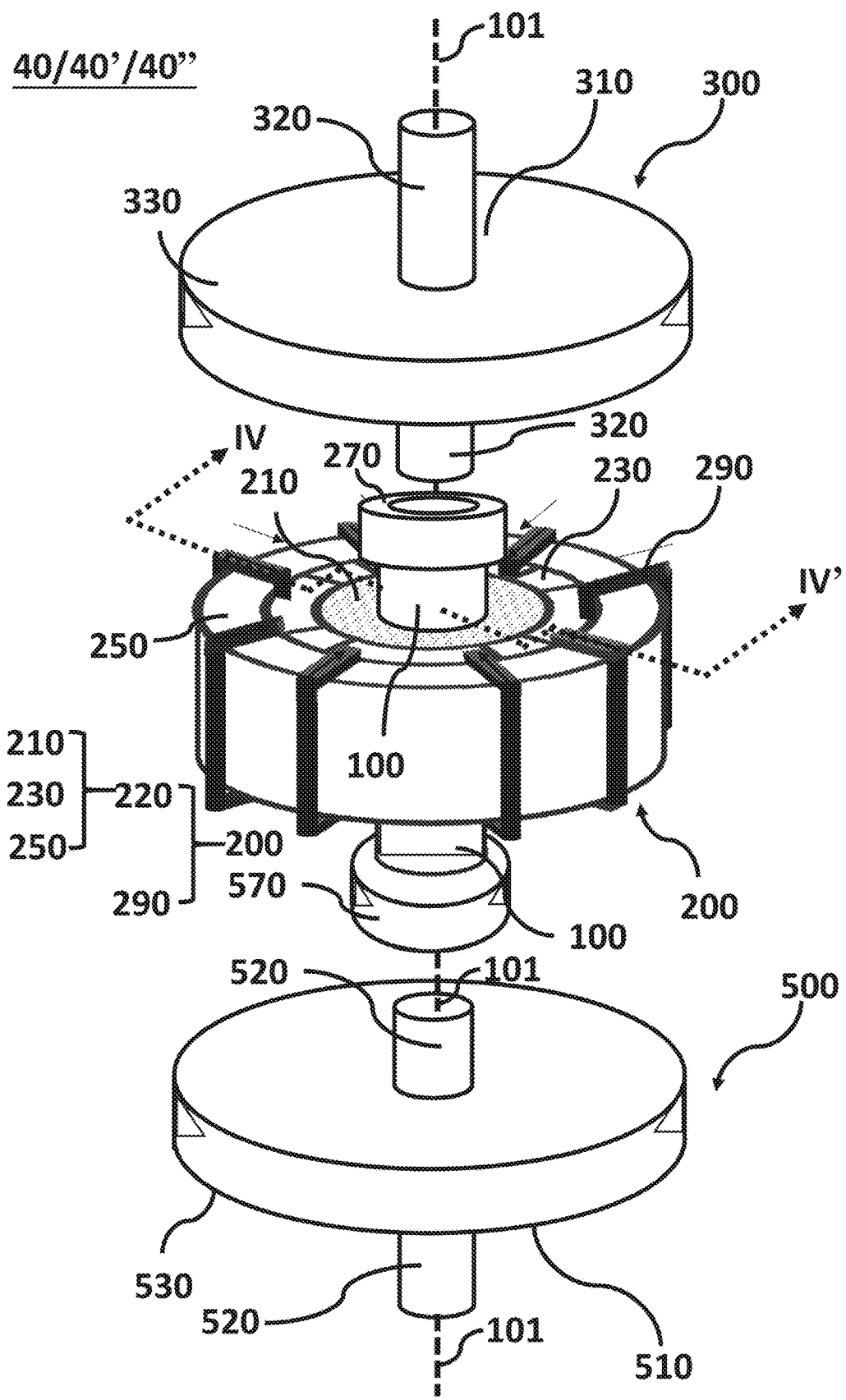
FIG. 4B is a stereoscopic exploded drawing of the DC dynamo 40, 40' and 40" as shown in FIG. 4A.

Next, please refer to FIG. 4A illustrating a stereoscopic assembly drawing of the DC dynamo 40, 40' and 40" of the embodiments 10, 11, and 12 according to this present invention, and 4B illustrating a stereoscopic exploded drawing of the DC dynamo 40, 40' and 40" as shown in FIG. 4A.

Figure 4C:
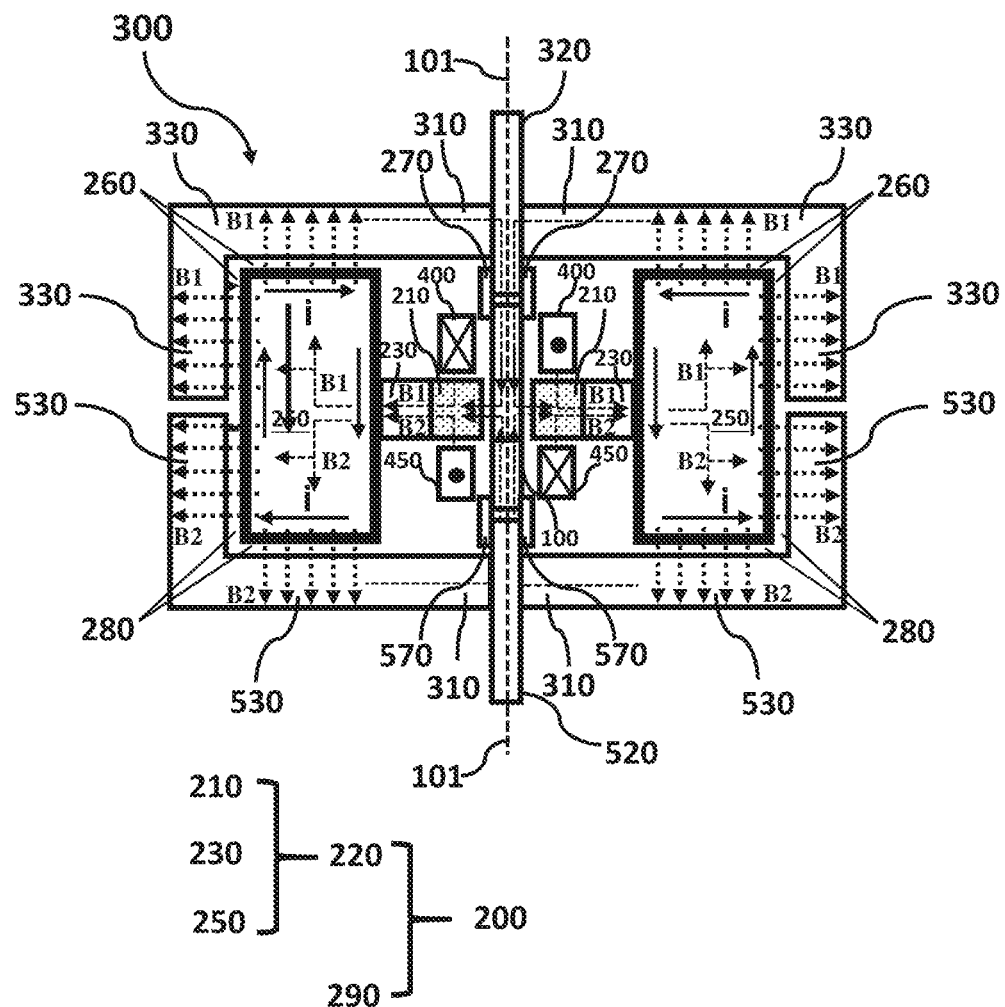
FIG. 4C is a cross-sectional view of the DC dynamo 40 of the embodiments 10 along the sectional line IV-IV'.
Figure 4C:
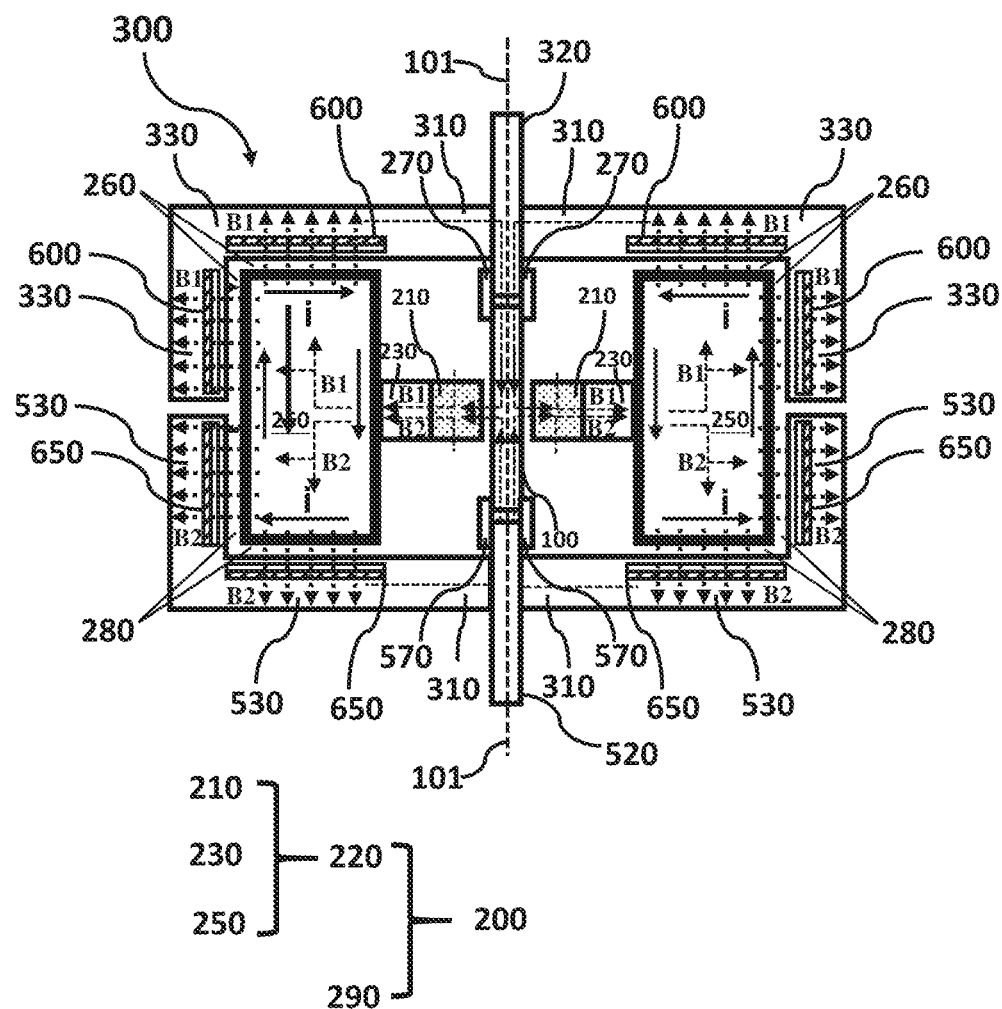

As shown in FIG. 4C, the configure of the DC dynamo 40 is similar to that of the DC dynamo 30 except the first central area 310 of the first magnetic mechanism 300 of the DC dynamo 40 further comprises a first rotatory axis 320 and the second central area 510 of the second magnetic mechanism 500 of the DC dynamo 40 further comprises a second rotatory axis 520, wherein the end of the first rotatory axis 320 nearby the first magnetic mechanism 300 further includes a first central axis bearing 270, and the end of the second rotatory axis 520 nearby the second magnetic mechanism 500 further includes a second central axis bearing 570, and the first rotatory axis 320 is running through the first central axis bearing 270 to make the armature 200 rotate relatively to the first magnetic mechanism 300 by means of the first rotatory axis 320 and the first central axis bearing 270, and the second rotatory axis 520 is running through the second central axis bearing 570 to make the armature 200 rotate relatively to the second magnetic mechanism 500 by means of the second rotatory axis 520 and the second central axis 100 bearing 570.

The DC dynamo 40 according to the embodiment 10 of this invention can also be used as a DC motor or a DC generator as the DC dynamos 30 of above-mentioned embodiment 7.

As shown in FIG. 4C', the configure of the DC dynamo 40' is similar to that of the DC dynamo 30' of the embodiment 8 except the first central area 310 of the first magnetic mechanism 300 of the DC dynamo 40 further comprises a first rotatory axis 320 and the second central area 510 of the second magnetic mechanism 500 of the DC dynamo 40 further comprises a second rotatory axis 520, wherein the end of the first rotatory axis 320 nearby the first magnetic mechanism 300 further includes a first central axis bearing 270, and the end of the second rotatory axis 520 nearby the second magnetic mechanism 500 further includes a second central axis bearing 570, and the first rotatory axis 320 is running through the first central axis bearing 270 to make the armature 200 rotate relatively to the first magnetic mechanism 300 by means of the first rotatory axis 320 and the first central axis bearing 270, and the second rotatory axis 520 is running through the second central axis bearing 570 to make the armature 200 rotate relatively to the second magnetic mechanism 500 by means of the second rotatory axis 520 and the second central axis 100 bearing 570.

The DC dynamo 40' according to the embodiment 11 of this invention can also be used as a DC motor or a DC generator as the DC dynamos 30 of above-mentioned embodiment 7.

As shown in FIG. 4C", the configure of the DC dynamo 40" is similar to that of the DC dynamo 30" of the embodiment 9 except the first central area 310 of the first magnetic mechanism 300 of the DC dynamo 40 further comprises a first rotatory axis 320 and the second central area 510 of the second magnetic mechanism 500 of the DC dynamo 40 further comprises a second rotatory axis 520, wherein the end of the first rotatory axis 320 nearby the first magnetic mechanism 300 further includes a first central axis bearing 270, and the end of the second rotatory axis 520 nearby the second magnetic mechanism 500 further includes a second central axis bearing 570, and the first rotatory axis 320 is running through the first central axis bearing 270 to make the armature 200 rotate relatively to the first magnetic mechanism 300 by means of the first rotatory axis 320 and the first central axis bearing 270, and the second rotatory axis 520 is running through the second central axis bearing 570 to make the armature 200 rotate relatively to the second magnetic mechanism 500 by means of the second rotatory axis 520 and the second central axis 100 bearing 570.

The DC dynamo 40" according to the embodiment 12 of this invention can also be used as a DC motor or a DC generator as the DC dynamos 30 of above-mentioned embodiment 7.

The DC dynamos 40, 40', 40" according to the embodiments 10, 11 and 12 of this invention, can further comprise a pair of armature electrodes (not shown) with a substantially same polarity of electromotive force electrically interconnecting the armature coils and an outer system (no shown).

The DC dynamos 40, 40', 40" according to the embodiments 10, 11 and 12 of this invention, wherein the first magnetic lines of flux and the second magnetic lines of flux are of different clockwises and further comprise a jointing mechanism (not shown) made of a magnetic material or a non-magnetic material outside the firs peripheral area 330 and the second peripheral area 530 to join the first magnetic mechanism 300 and the second magnetic mechanism 500 as a whole. Accordingly to another embodiments of this invention, the first electromagnetic coils 400 and/or the first permanent magnet 600 is/are used as the first magnetic field generator, and the second electromagnetic coils 450 and/or the second permanent magnet 650 is/are used as the second magnetic field generator The invention has been described by way of example and in terms of the preferred embodiments, it is to be understood that the invention is not limited to the disclosed-loop embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC dynamo, comprising:
   a central axis;
   an armature apparatus with a first side and a second side opposite to each other, comprising a body and a plurality of armature coils, and wherein the body includes a central body coupled to the central axis, a peripheral body surrounding the central body and a plurality of middle bodies for connecting the central body and the peripheral body, and the peripheral body is wound by the armature coils, and the number of the armature coils is no less than 2;
   a first magnetic mechanism adjacent to the first side of the armature apparatus, comprising a first central area, a first peripheral area surrounding the first central area, wherein part or whole of the first peripheral area corresponds to the armature coils, and there is a first air gap between the first magnetic mechanism and the armature coils;
   a first magnetic field generator for generating a closed-loop first magnetic field between the first magnetic mechanism and the armature apparatus, wherein the first magnetic lines of flux are flowing between the first magnetic mechanism and the armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along a virtual axis along the same direction as that of the central axis; and
   a pair of armature electrodes with a substantially same polarity of electromotive force electrically interconnecting the armature coils and an outer system.

2. The DC dynamo as claimed in claim 1, wherein the first magnetic field generator is an electromagnet coil and/or a first permanent magnet.

3. The DC dynamo as claimed in claim 2, wherein the first magnetic field generator is a first electromagnet coil located between the first magnetic mechanism and the armature apparatus to generate a closed-loop first magnetic field, wherein almost all of the first magnetic lines of flux substantially and orthogonally pass through the first air gap from the armature coils to the first magnetic mechanism or substantially and orthogonally pass through the first air gap from the first magnetic mechanism to the armature coils.

4. The DC dynamo as claimed in claim 2, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

5. The DC dynamo as claimed in claim 1, wherein the armature apparatus is a rotor, and the first magnetic mechanism is a stator.

6. The DC dynamo as claimed in claim 1, wherein the armature apparatus is a stator, and the first magnetic mechanism is a rotor.

7. The DC dynamo as claimed in any of claim 1 is a DC motor, wherein almost all of the first magnetic lines of flux substantially and orthogonally pass through the first air gap from the armature coils to the first magnetic mechanism, and
   when observing from the longitudinal section of the virtual axis and the current in one of the armature coils flows counterclockwise adjacent to the first air gap, a magnetic force injected inward to the longitudinal section of the virtual axis will be generated by the first magnetic field and the peripheral body of the armature coils based on the Fleming's left hand rule; or
   when observing from the longitudinal section of the virtual axis and the current in one of the armature coils flows clockwise adjacent to the first air gap, a magnetic force injected outward to the longitudinal section of the virtual axis will be generated by the first magnetic field and the peripheral body of the armature coils based on the Fleming's left hand rule; or
wherein almost all of the first magnetic field lines substantially and orthogonally pass through the first air gap from the first magnetic mechanism to the armature coils, and
   when observing from the longitudinal section of the virtual axis and the current in one of the armature coils flows counterclockwise adjacent to the first air gap, a magnetic force injected outward to the longitudinal section of the virtual axis will be generated by the first magnetic field and the peripheral body of the armature coils based on the Fleming's left hand rule; or
   when observing from the longitudinal section of the virtual axis and the current in one of the armature coils flows clockwise adjacent to the first air gap, a magnetic force injected inward to the longitudinal section of the virtual axis will be generated by the first magnetic field and the peripheral body of the armature coils based on the Fleming's left hand rule.

8. The DC dynamo as claimed in any of claim 1 is a DC generator,
   wherein almost all of the first magnetic lines of flux substantially and orthogonally pass through the first air gap from the armature coils to the first magnetic mechanism, and
      when observing from the longitudinal section of the virtual axis, the armature apparatus or the first magnetic mechanism is driven to make one of the armature coils adjacent to the first air gap be injected outward to the longitudinal section of the virtual axis and generate a counterclockwise induced electromotive force induced by the first magnetic field based on the Fleming's right hand rule;
      when observing from the longitudinal section of the virtual axis, the armature apparatus or the first magnetic mechanism is driven to make one of the armature coils adjacent to the first air gap be injected inward to the longitudinal section of the virtual axis and generate a clockwise induced electromotive force induced by the first magnetic field based on the Fleming's right hand rule;
   wherein almost all of the first magnetic lines of flux substantially and orthogonally pass through the first air gap from the first magnetic mechanism to the armature coils, and
      when observing from the longitudinal section of the virtual axis, the armature apparatus or the first magnetic mechanism is driven to make one of the armature coils adjacent to the first air gap be injected outward to the longitudinal section of the virtual axis and generate a clockwise induced electromotive force induced by the first magnetic field based on the Fleming's right hand rule; or when observing from the longitudinal section of the virtual axis, the armature apparatus or the first magnetic mechanism is driven to make one of the armature coils adjacent to the first air gap be injected inward to the longitudinal section of the virtual axis and generate a counterclockwise induced electromotive force induced by the first magnetic field based on the Fleming's right hand rule.

9. A DC dynamo, comprising:

a central axis;

an armature apparatus with a first side and a second side opposite to each other, comprising a body and a plurality of armature coils, and wherein the body includes a central body coupled to the central axis, a peripheral body surrounding the central body and a plurality of middle bodies for connecting the central body and the peripheral body, and the peripheral body is wound by the armature coils, and the number of the armature coils is no less than 2;

a first magnetic mechanism adjacent to the first side of the armature apparatus, comprising a first central area, a peripheral area surrounding the first central area, wherein part or whole of the first peripheral area corresponds to the armature coils, and there is a first air gap between the first magnetic mechanism and the armature coils;

a first magnetic field generator for generating a closed-loop first magnetic field between the first magnetic mechanism and the armature apparatus, wherein the magnetic lines of flux are flowing between the first magnetic mechanism and the armature apparatus, and almost all of the magnetic lines of flux substantially and orthogonally pass through the first air gap between each of the armature coils and the first magnetic mechanism in the same direction to drive the armature apparatus and the first magnetic field to respectively rotate along a virtual axis along the same direction as that of the central axis;

a second magnetic mechanism adjacent to the second side of the armature apparatus, comprising a second central area, a second peripheral area surrounding the second central area, wherein part or whole of the second peripheral area corresponds to the armature coils, and there is a second air gap between the second magnetic mechanism and the armature coils;

a second magnetic field generator for generating a closed-loop second magnetic field between the second magnetic mechanism and the armature apparatus, wherein second magnetic lines of flux are flowing between the second magnetic mechanism and the armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along a virtual axis along the same direction as that of the central axis; and a pair of armature electrodes with a substantially same polarity of electromotive force electrically interconnecting the armature coils and an outer system.

10. The DC dynamo as claimed in claim 9, wherein the first magnetic field generator is an electromagnet coil and/or a first permanent magnet, and the second magnetic field generator is an electromagnet coil and/or a first permanent magnet.

11. The DC dynamo as claimed in claim 10, wherein the first magnetic field generator is a first electromagnet coil located between the first magnetic mechanism and the armature apparatus to generate a closed-loop first magnetic field, wherein almost all of the first magnetic lines of flux substantially and orthogonally pass through the first air gap from the armature coils to the first magnetic mechanism or substantially and orthogonally pass through the first air gap from the first magnetic mechanism to the armature coils.

12. The DC dynamo as claimed in claim 10, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

13. The DC dynamo as claimed in claim 10, wherein the second magnetic field generator is a second electromagnet coil located between the second magnetic mechanism and the armature apparatus to generate a closed-loop second magnetic field, wherein almost all of the second magnetic lines of flux substantially and orthogonally pass through the second air gap from the armature coils to the second magnetic mechanism or substantially and orthogonally pass through the second air gap from the second magnetic mechanism to the armature coils.

14. The DC dynamo as claimed in claim 10, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

15. The DC dynamo as claimed in claim 9, wherein the armature apparatus is a rotor, and the first magnetic mechanism and the second magnetic mechanism are stators.

16. The DC dynamo as claimed in claim 9, wherein the armature apparatus is a stator, and the first magnetic mechanism and the second magnetic mechanism are rotors.

17. The DC dynamo as claimed in claim 9, wherein the first magnetic lines of flux and the second magnetic lines of flux are of different clockwises, and the DC dynamo further comprises a jointing mechanism outside the first and the second peripheral areas to join the first and the second magnetic mechanisms as a whole.

18. The DC dynamo as claimed in claim 17, wherein the jointing mechanism is made of a magnetic material or a non-magnetic material.

19. The DC dynamo as claimed in any of claim 9 is a DC motor, wherein almost all of the first magnetic lines of flux substantially and orthogonally pass through the first air gap from the armature coils to the first magnetic mechanism, and almost all of the second magnetic lines of flux substantially and orthogonally pass through the second air gap from the armature coils to the second magnetic mechanism, and when observing from the longitudinal section of the virtual axis and the current in one of the armature coils flows counterclockwise adjacent to the first air gap and the second air gap, a magnetic force injected inward to the longitudinal section of the virtual axis will be generated by the first magnetic field, the second magnetic field and the peripheral body of the armature coils based on the Fleming's left hand rule; or when observing from the longitudinal section of the virtual axis and the current in one of the armature coils flows clockwise adjacent to the first air gap and the second air gap, a magnetic force injected outward to the longitudinal section of the virtual axis will be generated by the first magnetic field, the second magnetic field and the peripheral body of the armature coils based on the Fleming's left hand rule; or wherein almost all of the first magnetic lines of flux substantially and orthogonally pass through the first air gap from the first magnetic mechanism to the armature coils, and almost all of the second magnetic lines of flux substantially and orthogonally pass through the second air gap from the second magnetic mechanism to the armature coils, and when observing from the longitudinal section of the virtual axis and the current in one of the armature coils flows counterclockwise adjacent to the first air gap and the second air gap, a magnetic force injected outward to the longitudinal section of the virtual axis will be generated by the first magnetic field, the second magnetic field and the peripheral body of the armature coils based on the Fleming's left hand rule; or when observing from the longitudinal section of the virtual axis and the current in one of the armature coils flows clockwise adjacent to the first air gap and the second air gap, a magnetic force injected inward to the longitudinal section of the virtual axis will be generated by the first magnetic field, the second magnetic field and the peripheral body of the armature coils based on the Fleming's left hand rule.

20. The DC dynamo as claimed in any of claim 9 is a DC generator, wherein almost all of the first magnetic lines of flux substantially and orthogonally pass through the first air gap from the armature coils to the first magnetic mechanism, and almost all of the second magnetic lines of flux substantially and orthogonally pass through the second air gap from the armature coils to the second magnetic mechanism, and when observing from the longitudinal section of the virtual axis, the armature apparatus or the first magnetic mechanism, the second magnetic mechanism is driven to make one of the armature coils adjacent to the first air gap or the second air gap be injected outward to the longitudinal section of the virtual axis and generate a counterclockwise induced electromotive force induced by the first magnetic field or the second magnetic field based on the Fleming's right hand rule; or when observing from the longitudinal section of the virtual axis, the armature apparatus or the first magnetic mechanism, the second magnetic mechanism is driven to make one of the armature coils adjacent to the first air gap or the second air gap be injected inward to the longitudinal section of the virtual axis and generate a clockwise induced electromotive force induced by the first magnetic field or the second magnetic field based on the Fleming's right hand rule; or wherein almost all of the first magnetic lines of flux substantially and orthogonally pass through the first air gap from the first magnetic mechanism to the armature coils, and almost all of the second magnetic lines of flux substantially and orthogonally pass through the second air gap from the first magnetic mechanism to the armature coils, and when observing from the longitudinal section of the virtual axis, the armature apparatus or the first magnetic mechanism, the second magnetic field is driven to make one of the armature coils adjacent to the first air gap or the second air gap be injected outward to the longitudinal section of the virtual axis and generate a clockwise induced electromotive force induced by the first magnetic field or the second magnetic field based on the Fleming's right hand rule; or when observing from the longitudinal section of the virtual axis, the armature apparatus or the first magnetic mechanism, the second mechanism is driven to make one of the armature coils adjacent to the first air gap or the second air gap be injected inward to the longitudinal section of the virtual axis and generate a counterclockwise induced electromotive force induced by the first magnetic field or the second magnetic field based on the Fleming's right hand rule.

* * * * *